US006576306B2

(12) United States Patent
Mehta et al.

(10) Patent No.: US 6,576,306 B2
(45) Date of Patent: Jun. 10, 2003

(54) PROPYLENE POLYMERS FOR FILMS

(75) Inventors: Aspy K. Mehta, Humble, TX (US);
Michael C. Chen, Houston, TX (US);
James J. McAlpin, Houston, TX (US);
Anthony N. Speca, Kingwood, TX (US); Kelly Tormaschy, Round Rock, TX (US); Chon Y. Lin, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 50 days.

(21) Appl. No.: 09/800,239

(22) Filed: Mar. 6, 2001

(65) Prior Publication Data
US 2001/0039314 A1 Nov. 8, 2001

Related U.S. Application Data

(63) Continuation-in-part of application No. 08/916,699, filed on Aug. 22, 1997, now abandoned.
(60) Provisional application No. 60/025,398, filed on Sep. 4, 1996.

(51) Int. Cl.$^7$ .......................... B32B 1/08; C08L 23/14; C08L 10/06; C08L 210/06
(52) U.S. Cl. .................. 428/35.5; 428/35.7; 525/240; 526/348; 526/348.1
(58) Field of Search ................. 428/35.5, 35.7; 525/240; 526/348, 348.1

(56) References Cited

U.S. PATENT DOCUMENTS

| | | |
|---|---|---|
| 3,937,762 A | 2/1976 | Nahmias et al. |
| 5,118,566 A | 6/1992 | Wilhelm et al. |
| 5,145,819 A | 9/1992 | Winter et al. |
| 5,216,095 A | 6/1993 | Dolle et al. |
| 5,218,052 A | 6/1993 | Cohen et al. |
| 5,280,074 A | 1/1994 | Schreck et al. |
| 5,298,561 A | 3/1994 | Cecchin et al. |
| 5,331,054 A | 7/1994 | Fujita et al. |
| 5,350,817 A | 9/1994 | Winter et al. |
| 5,389,448 A | 2/1995 | Schirmer et al. |
| 5,539,056 A | 7/1996 | Yang et al. |
| 5,539,066 A | 7/1996 | Winter et al. ............... 526/119 |
| 5,548,008 A | 8/1996 | Asanuma et al. |
| 5,587,501 A | 12/1996 | Winter et al. ............... 556/53 |
| 5,700,886 A | 12/1997 | Winter et al. |
| 5,708,090 A | 1/1998 | Schreck et al. |
| 5,741,563 A * | 4/1998 | Mehta et al. ............... 428/34.9 |
| 5,786,291 A | 7/1998 | Speca et al. |
| 5,891,814 A * | 4/1999 | Richeson et al. ........... 442/401 |
| 6,143,911 A | 11/2000 | Fujita et al. |
| 6,207,750 B1 | 3/2001 | Lin et al. |

FOREIGN PATENT DOCUMENTS

| | | | |
|---|---|---|---|
| CA | 2105914 | 3/1994 | |
| CA | 2142521 | 3/1995 | |
| CA | 2133181 | 8/1995 | |
| EP | 0 516 019 A2 | 12/1992 | .......... C08F/4/642 |
| EP | 0 310 734 B1 | 11/1994 | |
| EP | 0 691 366 A1 | 1/1996 | |
| EP | 0 704 462 A1 | 4/1996 | |
| EP | 0 905 173 A1 | 3/1999 | .............. C08J/5/18 |
| EP | 0 704 463 B1 | 7/1999 | |
| WO | WO 98/10016 | 3/1998 | |
| WO | WO 98/59002 | 12/1998 | .......... C08L/23/16 |
| WO | WO 99/58587 | 11/1999 | .......... C08F/110/06 |

OTHER PUBLICATIONS

Abstract for EP 0 643 084 A2—Mar. 15, 1995.
Abstract for EP 0 702 030 A1—Mar. 20, 1996.
Olefin Polymers (Polypropylene),: R. B. Leiberman, Encyclopedia of Chem. Technology, 4th Ed., vol. 17, p. 787.
"Physical Constants Of Poly(propylene)*, " R. P. Quirk, et al, Polymer Handbook, 3rd Ed., p. 27, 29, 30, 32 (1989).
"Film, High Density Polyethylene," M. Bakker, et al, The Wiley Encyclopedia of Packaging Technology, p. 314 (1986).
"Isotactic PP," E. Albizzati, et al, Polypropylene Handbook, p. 409.
The Effect of Aluminum Compounds In The Copolymerization of Ethylene/α–Olefins, Katayama, et al, Macromol. Symp. P. 109–118 (1995).

* cited by examiner

*Primary Examiner*—D. R. Wilson
(74) *Attorney, Agent, or Firm*—Paige Schmidt; Kevin M. Faulkner; Leandro Arechederra

(57) ABSTRACT

This invention relates generally to crystalline propylene polymers, to methods for their production and to methods for their use in film applications. Specifically, this invention relates to crystalline propylene polymers comprising both propylene homopolymer and propylene copolymer. The compositions are prepared using metallocene catalyst systems comprising at least two metallocenes in a polymerization process that involves the sequential or parallel polymerization of propylene homopolymer and copolymer using propylene with a small amount of comonomer, preferably ethylene. The polymerization is catalyzed by a dual metallocene catalyst system. The resulting polymers have a broad, bimodal molecular weight distribution. The resulting polymers are excellent for use in the production of biaxially oriented films or non-oriented films. Films prepared with these propylene polymers have a significantly broader processability range and can be evenly stretched at lower temperature compared to films prepared from traditional propylene polymer.

28 Claims, 11 Drawing Sheets

GPC Molecular Weight Distributions

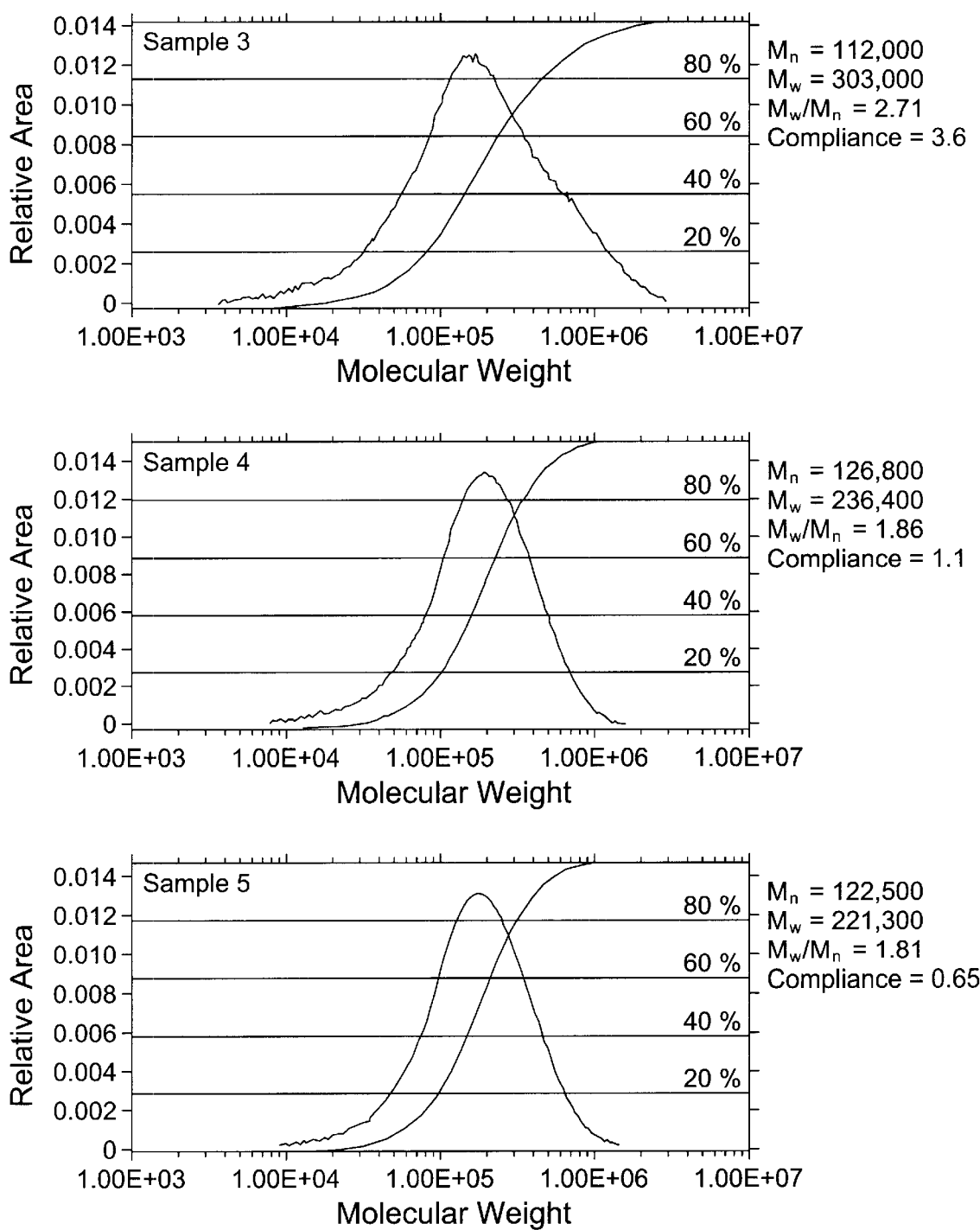

Fig. 3
DSC Melting Distributions
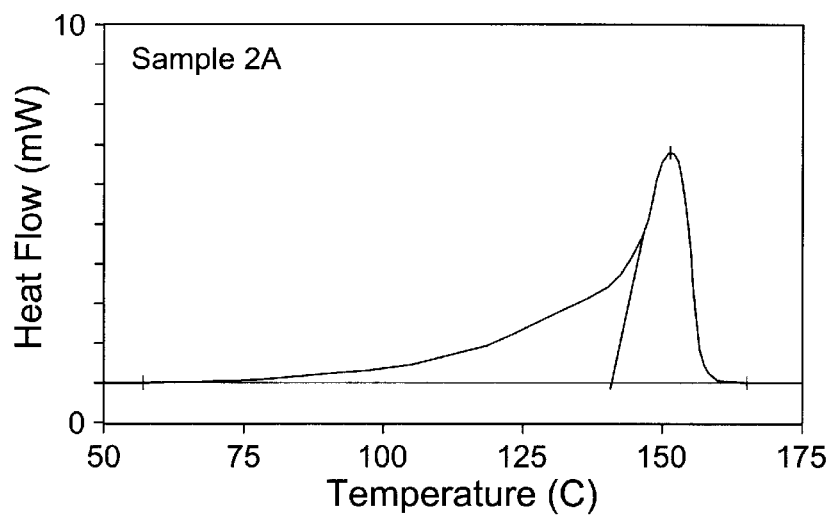
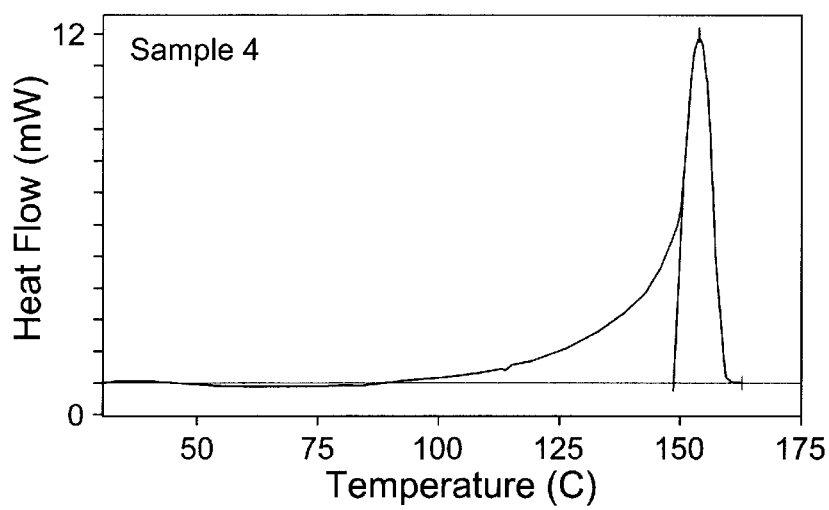
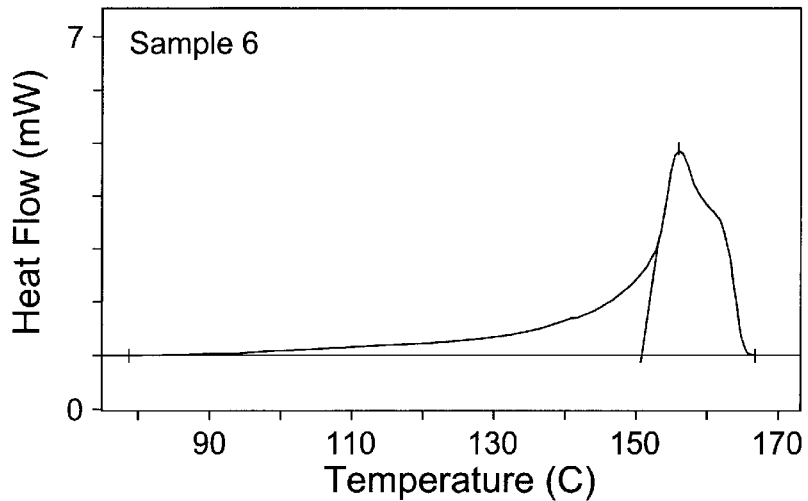

Processing Window During Biaxial Stretching

Samples stretched on batch, biaxial stretching apparatus
MD x TD Stretching Ratio = 6 x 6

Processing Window During Biaxial Stretching

Samples stretched on batch, biaxial stretching apparatus
MD x TD Stretching Ratio = 6 x 6

Processability of Samples 2B and 9

GPC Molecular Weight Distribution of Sample 10 Reactor Discharged Polymers

Molecular Weight Distribution of Sample 10 and Its Fractions

Shear Viscosity versus Shear Rate

PROPYLENE POLYMERS FOR FILMS

CROSS-REFERENCE TO RELATED APPLICATIONS

This application is a Continuation-in-Part of U.S. application Ser. No. 08/916,699 filed Aug. 22, 1997, abandoned, which claims the benefit of U.S. Provisional Application Serial No. 60/025,398, filed Sep. 4, 1996.

FIELD OF THE INVENTION

This invention relates generally to propylene polymers, to methods for their production and to methods for their use in oriented and non-oriented film applications. More particularly, the present invention relates to a two-stage polymerization process used to make tailored crystallinity resins and random copolymers of propylene and ethylene using a dual metallocene catalyst system.

BACKGROUND

Polypropylene films are widely used in tape applications and in packaging applications such as food packaging. The optimization of processing characteristics and film properties of propylene based films has been the subject of intense effort. U.S. Pat. No. 5,118,566, for example, describes a biaxially oriented film made from polypropylene, a natural or synthetic resin, and a nucleating agent. The process for producing this film includes biaxially drawing the film at temperatures below the melting point of the polypropylene.

Critical to the Theological properties of the film is the starting propylene polymer. For instance, as discussed by A. K. Mehta et al. in 2 Metallocene-Based Polyolefins 463–488 (J. Scheirs & W. Kaminsky eds., John Wiley & Sons 2000), properties such as the molecular weight distribution (MWD), composition distribution (CD), tacticity, and α-olefin incorporation are important in final film performance. Attempts to achieve these optimal properties have been made with polymerization processes catalyzed by conventional Ziegler-Natta (ZN) catalysts as well as single metallocene catalysts. While metallocene catalyzed propylene polymer is known, single metallocene, single stage production processes are often inadequate to achieve the range of desired properties for films. To achieve ideal performance, polypropylene production methods must be tailored to meet the desired characteristics. One such production method that can tailor the resultant polypropylene polymer is a multi-stage metallocene process, where the α-olefin incorporation can take place in one or more stages during the propylene polymerization.

Multiple stage polymerization processes are known in the art as is the use of multiple metallocenes. However, multiple stage polymerization processes are typically used to prepare block copolymers which contain rubbery materials as opposed to the crystalline polymers. U.S. Pat. Nos. 5,280,074; 5,322,902, 5,346,925, and WO98/10016, for example, describe two-stage processes for producing propylene block copolymers. The propylene/ethylene copolymer portion of these compositions is a non-crystalline, rubbery material suitable for molding applications rather than films. U.S. Pat. No. 5,708,090 discuses a two stage process for making polypropylene based materials for high impact molding applications. EP 0 704 463 discloses a two stage process using metallocenes that produce polymer suitable for low impact resistance applications having a relatively high comonomer content.

Ziegler-Natta based propylene polymers and copolymers have been used to make films as described in U.S. Pat. No. 5,298,561. U.S. Pat. No. 5,350,817 and Canadian Patent Application No. 2,133,181 describe the use of two or more metallocenes for the preparation of isotactic propylene polymers, however, neither reference describes a multiple stage process for the production of crystalline polymers such as those described herein.

There is a need to produce propylene homopolymer and copolymer films having a combination of desirable attributes that is not achieved in the prior art. A film is needed that combines the attributes of high melt strength at low shear rate while improving shear thinning at high shear rate. A film should also have a broad processing window during fabrication and a favorable balance of film properties not yet achieved in the art.

SUMMARY

The present invention is directed towards such a film, and the propylene polymers used to make such a film, wherein the polymer resulting from the method of the invention has a broadened molecular weight distribution in at least the second stage of the process, while maintaining a high degree of crystallinity.

The inventors of the present invention have found that the properties of propylene polymers can be tailored by forming either a tailored crystallinity resin, or a random copolymer. A "tailored crystallinity resin" (TCR) is a polymer made by polymerizing propylene in one stage and then further polymerizing propylene and a minor amount of comonomer in a separate stage using a metallocene catalyst system comprising at least two metallocenes in each of the stages. A "random copolymer" (RCP), as used here, is a crystalline propylene composition made by polymerizing propylene and a minor amount of comonomer in a single stage or multiple stage process using a metallocene catalyst system comprising at least two metallocenes in each of the stages, wherein the comonomer is incorporated into all stages of the polymerization. The resulting polymers of this invention have surprisingly high molecular weights and broad molecular weight distributions, and offer processability benefits in oriented and non-oriented film applications. Films made from these unique polymers have a significantly broader processability range and can be evenly stretched at lower temperatures compared to the polypropylene films available today. The resulting films have a favorable balance of properties including high strength, good optical properties and good barrier properties.

Specifically, the inventors have found that the incorporation of less than or equal to 1 wt % ethylene comonomer in one embodiment, and from 1 to 5 wt % ethylene comonomer in another embodiment, during the polymerization process as described herein results in a substantial broadening of the molecular weight distribution at the high molecular weight end as evidenced by the relatively large value in the molecular weights, and $M_z$ values. This is unexpected since with both the individual metallocenes used alone the molecular weight drops with ethylene addition. The molecular weight broadening improves the rheological properties of the film as described herein.

The objects of the invention are achieved by providing a propylene homopolymer and copolymer having a broad molecular weight distribution, while maintaining a high level of crystallinity. This is achieved by providing in one embodiment a TCR propylene polymer comprising: (a) from 10 to 90 wt % homopolymerized crystalline propylene units; and (b) from 90 to 10 wt % crystalline propylene copolymer wherein the wt % of the comonomer based on the total weight of the polymer is in the range of from 0.05 to 15; wherein each polymer is prepared in a separate stage utilizing in each stage a metallocene catalyst system comprising two metallocene catalyst components and wherein the polymer has a molecular weight distribution (Mw/Mn) in the range of from 2.1 to 10. In another embodiment, the objectives are achieved by providing an RCP crystalline propylene copolymer, wherein the wt % of the comonomer based on the total weight of the polymer is in the range from about 0.05 to about 15, wherein the RCP is prepared in a single stage or multiple stage utilizing in each stage a metallocene catalyst system comprising two metallocene catalyst components, and wherein the RCP has a molecular weight distribution (Mw/Mn) in the range from about 2.1 to about 10.

DESCRIPTION OF DRAWINGS

FIG. 3 is a DSC Melting Distribution plot of Samples 2A, 4, and 6;

DETAILED DESCRIPTION

Figure 1A:
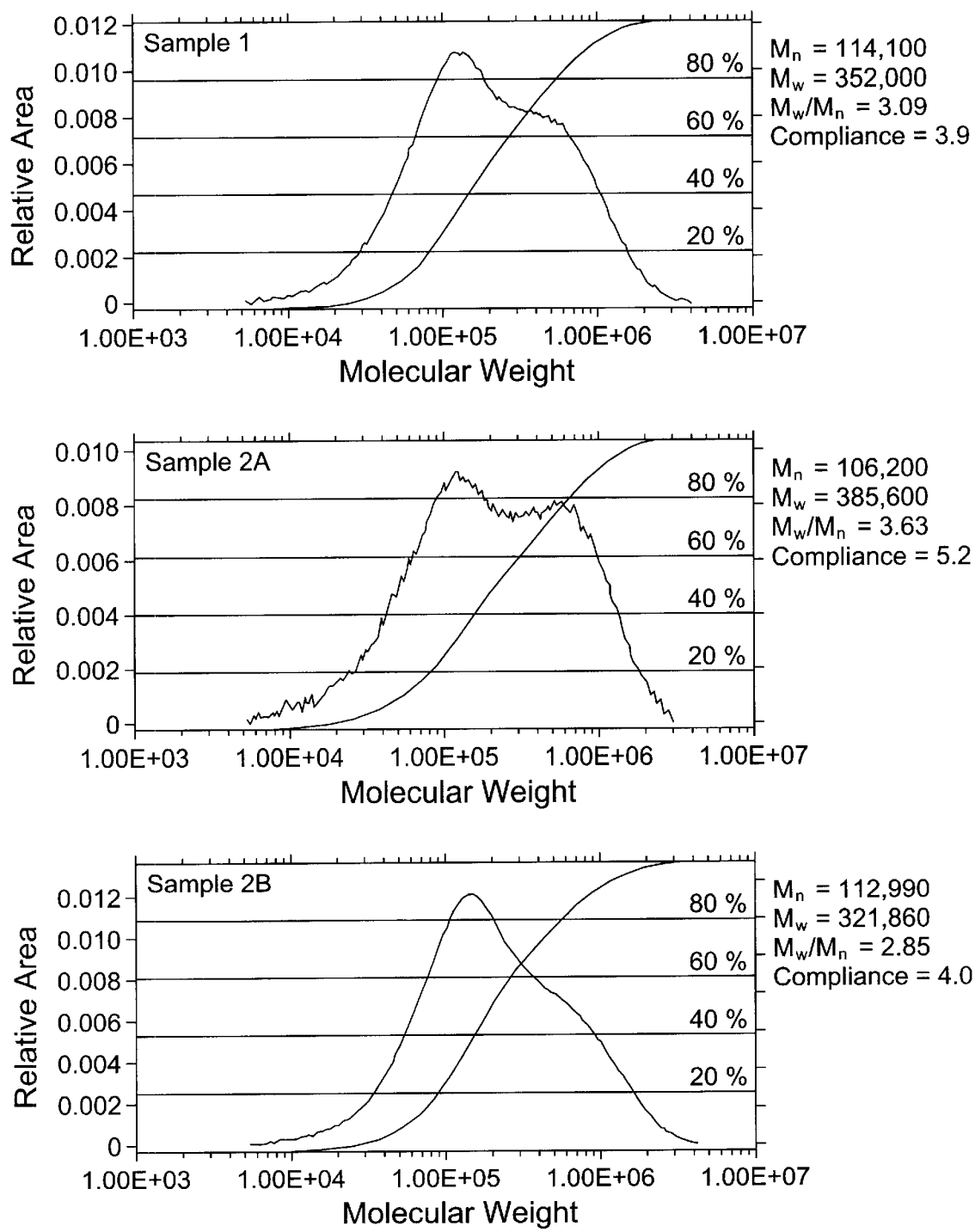
FIG. 1 is a GPC Molecular Weight Distribution plot of Samples 1, 2A, 2B, 3, 4, and 5.

This invention relates to (1) crystalline propylene polymers, and methods of making the polymers, and (2) oriented and non-oriented films made from the crystalline propylene polymers and methods of making these films. These are described in turn below.

As used herein "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn). The "Mz" value is the high average molecular weight value, calculated as discussed by A. R. Cooper in Concise Encyclopedia Of Polymer Science And Engineering 638–39 (J. I. Kroschwitz, ed. John Wiley & Sons 1990).

As used herein, the new numbering scheme for the Periodic Table of Elements Groups are used as in Hawley's Condensed Chemical Dictionary 852 (John Wiley & Sons, 13th ed. 1997).

As used herein, unless differentiated, "polymerization" includes copolymerization and terpolymerization, "monomer" includes comonomer and termonomer, and "polymer" includes copolymer and terpolymer.

Methods for Making Crystalline Propylene Polymers

The methods of this invention involve the use of metallocene catalyst systems that comprise at least two metallocenes and an activator. Desirably, these catalyst system components are supported on a support material.

Metallocenes

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1-3, n=0-3, q=0-3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723, 6,143,686; and 5,391,790.

Preferred metallocenes are represented by the formula:

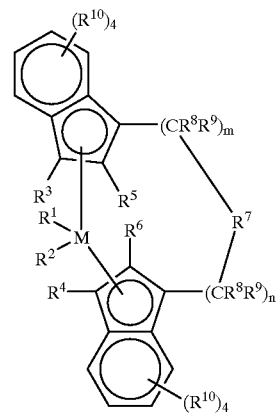

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ a re hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

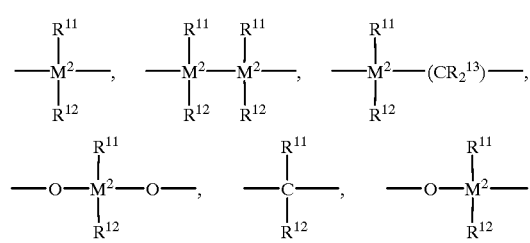

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein $R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from 4–6 carbon atoms.

Alkyl refers to straight or branched chain substituents. Halogen (halogenated) refers to fluorine, chlorine, bromine or iodine atoms, preferably fluorine or chlorine.

Particularly desirable metallocenes are compounds of the structures (1) and (2):

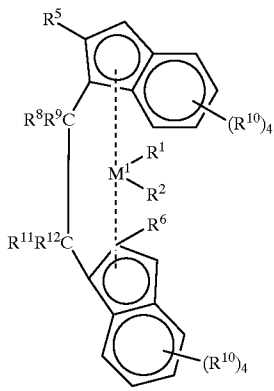

(1)

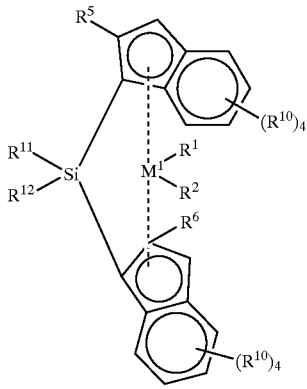

(2)

wherein $M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

These chiral metallocenes may be used as a racemate mixture for the preparation of highly isotactic polypropylene copolymers. It is also possible to use the pure R or S form. An optically active polymer can be prepared with these pure stereoisomeric forms. Preferably, the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multi-step process involving repeated deprotonations/metallations of the aromatic ligands and introduction of the bridge and the central atom by their halogen derivatives. While not meaning to be bound by the following scheme, the reaction scheme below illustrates this generic approach:

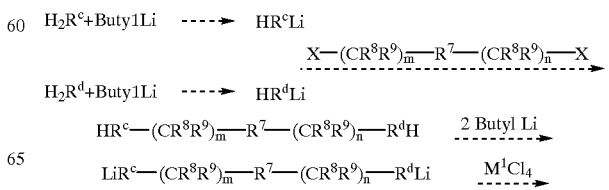

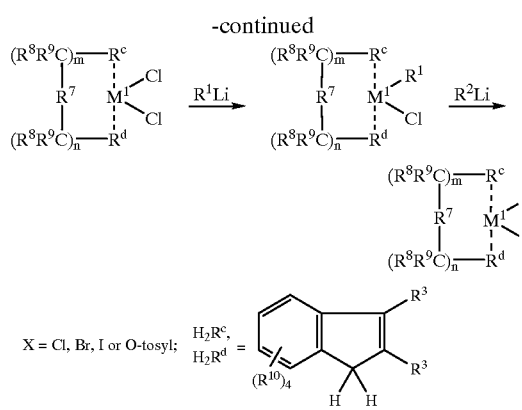

Additional methods for preparing metallocenes are fully described in the 288 *J. Organometallic Chem.* 63–67 (1985), and in BP-A-320762.

Illustrative but non-limiting examples of preferred metallocenes include the following:

Dimethylsilandiylbis(2-methyl-4-phenyl-1-indenyl) zirconium dichloride
Dimethylsilandiylbis(2-methyl-4,5-benzoindenyl) zirconium dichloride;
Dimethylsilandiylbis(2-methyl-4,6-diisopropylindenyl) zirconium dichloride;
Dimethylsilandiylbis(2-ethyl-4-phenyl-1-indenyl) zirconium dichloride;
Dimethylsilandiylbis(2-methyl-4-naphthyl-1-indenyl) zirconium dichloride
Dimethylsilandiylbis(2-ethyl-4-naphthyl-1-indenyl) zirconium dichloride,
Phenyl(methyl)silandiylbis(2-methyl-4-phenyl-1-indenyl) zirconium dichloride,
Dimethylsilandiylbis(2-methyl-4-(1-naphthyl)-1-indenyl) zirconium dichloride,
Dimethylsilandiylbis(2-methyl-4-(2-naphthyl)-1-indenyl) zirconium dichloride,
Dimethylsilandiylbis(2-methyl-indenyl) zirconium dichloride,
Dimethylsilandiylbis(2-methyl-4,5-diisopropyl-1-indenyl) zirconium dichloride,
Dimethylsilandiylbis(2,4,6-trimethyl-1-indenyl) zirconium dichloride,
Phenyl(methyl)silandiylbis(2-methyl-4,6-diisopropyl-1-indenyl) zirconium dichloride,
1,2-Ethandiylbis(2-methyl-4,6-diisopropyl-1-indenyl) zirconium dichloride,
1,2-Butandiylbis(2-methyl-4,6-diisopropyl-1-indenyl) zirconium dichloride,
Dimethylsilandiylbis(2-methyl-4-ethyl-1-indenyl) zirconium dichloride,
Dimethylsilandiylbis(2-methyl-4-isopropyl-1-indenyl) zirconium dichloride,
Dimethylsilandiylbis(2-methyl-4-t-butyl-1-indenyl) zirconium dichloride,
Phenyl(methyl)silandiylbis(2-methyl-4-isopropyl-1-indenyl) zirconium dichloride,
Dimethylsilandiylbis(2-ethyl-4-methyl-1-indenyl) zirconium dichloride,
Dimethylsilandiylbis(2,4-dim ethyl-1-indenyl) zirconium dichloride,
Dimethylsilandiylbis(2-methyl-4-ethyl-1-indenyl) zirconium dichloride,
Dimethylsilandiylbis(2-methyl-α-acenaphthyl-1-indenyl) zirconium dichloride,
Phenyl(methyl)silandiylbis(2-methyl-4,5-benzo-1-indenyl) zirconium dichloride,
Phenyl(methyl)silandiylbis(2-methyl-4,5-(methylbenzo)-1-indenyl) zirconium dichloride,
Phenyl(methyl)silandiylbis(2-methyl-4,5-(tetramethylbenzo)-1-indenyl) zirconium dichloride,
Phenyl(methyl)silandiylbis (2-methyl-α-acenaphthyl-1-indenyl) zirconium dichloride,
1,2-Ethandiylbis(2-methyl-4,5-benzo-1-indenyl) zirconium dichloride,
1,2-Butandiylbis(2-methyl-4,5-benzo-1-indenyl) zirconium dichloride,
Dimethylsilandiylbis(2-methyl-4,5-benzo-1-indenyl) zirconium dichloride,
1,2-Ethandiylbis(2,4,7-trimethyl-1-indenyl) zirconium dichloride,
Dimethylsilandiylbis(2-methyl-1-indenyl) zirconium dichloride,
1,2-Ethandiylbis(2-methyl-1-indenyl) zirconium dichloride,
Phenyl(methyl)silandiylbis(2-methyl-1-indenyl) zirconium dichloride,
Diphenylsilandiylbis(2-methyl-1-indenyl) zirconium dichloride,
1,2-Butandiylbis(2-methyl-1-indenyl) zirconium dichloride,
Dimethylsilandiylbis(2-ethyl-1-indenyl) zirconium dichloride,
Dimethylsilandiylbis(2-methyl-5-isobutyl-1-indenyl) zirconium dichloride,
Phenyl(methyl)silandiylbis(2-methyl-1-isobutyl-1-indenyl) zirconium dichloride,
Dimethylsilandiylbis(2-methyl-5-isobutyl-1-indenyl) zirconium dichloride,
Dimethylsilandiylbis(2,5,6-trimethyl-1-indenyl) zirconium dichloride,
Dimethylsilandiylbis (2-methyl-4-phenyl-1-indenyl) zirconium dimethyl,
Dimethylsilandiylbis(2-methyl-4,5-benzoindenyl) zirconium dimethyl;
Dimethylsilandiylbis(2-methyl-4,6-diisopropylindenyl) zirconium dimethyl;
Dimethylsilandiylbis(2-ethyl-4-phenyl-1-indenyl) zirconium dimethyl;
Dimethylsilandiylbis (2-methyl-4-naphthyl-1-indenyl) zirconium dimethyl
Dimethylsilandiylbis (2-ethyl-4-naphthyl-1-indenyl) zirconium dimethyl,
Phenyl(methyl)silandiylbis(2-methyl-4-phenyl-1-indenyl) zirconium dimethyl,
Dimethylsilandiylbis(2-methyl-4-(1-naphthyl)-1-indenyl) zirconium dimethyl,
Dimethylsilandiylbis(2-methyl-4-(2-naphthyl)-1-indenyl) zirconium dimethyl,
Dimethylsilandiylbis(2-methyl-indenyl) zirconium dimethyl,
Dimethylsilandiylbis(2-methyl-4,5-diisopropyl-1-indenyl) zirconium dimethyl,
Dimethylsilandiylbis(2,4,6-trimethyl-1-indenyl) zirconium dimethyl,
Phenyl(methyl)silandiylbis(2-methyl-4,6-diisopropyl-1-indenyl) zirconium dimethyl,
1,2-Ethandiylbis(2-methyl-4,6-diisopropyl-1-indenyl) zirconium dimethyl,
1,2-Butandiylbis(2-methyl-4,6-diisopropyl-1-indenyl) zirconium dimethyl,
Dimethylsilandiylbis(2-methyl-4-ethyl-1-indenyl) zirconium dim ethyl,
Dimethylsilandiylbis(2-methyl-4-isopropyl-1-indenyl) zirconium dimethyl, Dimethylsilandiylbis(2-methyl-4-t-butyl-1-indenyl) zirconium dimethyl,
Phenyl(methyl)silandiylbis(2-methyl-4-isopropyl-1-indenyl) zirconium dimethyl,
Dimethylsilandiylbis(2-ethyl-4-methyl-1-indenyl) zirconium dimethyl,
Dimethylsilandiylbis(2,4-dim ethyl-1-indenyl) zirconium dim ethyl,
Dimethylsilandiylbis(2-methyl-4-ethyl 1-indenyl) zirconium dimethyl,
Dimethylsilandiylbis(2-methyl-α-acenaphthyl-1-indenyl) zirconium dimethyl,
Phenyl(methyl)silandiylbis(2-methyl-4,5-benzo-1-indenyl) zirconium dimethyl,
Phenyl(methyl)silandiylbis(2-methyl-4,5-(methylbenzo)-1-indenyl) zirconium dimethyl,
Phenyl(methyl)silandiylbis(2-methyl-4,5-(tetramethyl-benzo)-1-indenyl) zirconium dimethyl,
Phenyl(methyl)silandiylbis (2-methyl-α-acenaphthyl-1-indenyl) zirconium dimethyl,
1,2-Ethandiylbis(2-methyl-4,5-benzo-1-indenyl) zirconium dimethyl,
1,2-Butandiylbis(2-methyl-4,5-benzo-1-indenyl) zirconium dimethyl,
Dimethylsilandiylbis(2-methyl-4,5-benzo-1-indenyl) zirconium dimethyl,
1,2-Ethandiylbis(2,4,7-trimethyl-1-indenyl) zirconium dimethyl,
Dimethylsilandiylbis(2-methyl-1-indenyl) zirconium dimethyl,
1,2-Ethandiylbis(2-methyl-1-indenyl) zirconium dimethyl,
Phenyl(methyl)silandiylbis(2-methyl-1-indenyl) zirconium dimethyl,
Diphenylsilandiylbis(2-methyl-1-indenyl) zirconium dimethyl,
1,2-Butandiylbis(2-methyl-1-indenyl) zirconium dimethyl,
Dimethylsilandiylbis(2-ethyl-1-indenyl) zirconium dimethyl,
Dimethylsilandiylbis(2-methyl-5-isobutyl-1-indenyl) zirconium dimethyl,
Phenyl(methyl)silandiylbis(2-methyl-5-isobutyl-1-indenyl) zirconium dimethyl,
Dimethylsilandiylbis(2-methyl-5-t-butyl-1-indenyl) zirconium dimethyl,
Dimethylsilandiylbis(2,5,6-trimethyl-1-indenyl) zirconium dimethyl, and the like.

These preferred metallocene catalyst components are described in detail in U.S. Pat. Nos. 6,143,686, 5,145,819; 5,243,001; 5,239,022; 5,329,033; 5,296,434; and 5,276,208; and 5,374,752; and EP 549 900 and 576 970.

The metallocenes preferably selected for use in this invention are two or more different metallocenes which, when used alone, produce isotactic, crystalline propylene polymer and when used in combination, produce polymer having the attributes desired for the particular film application of interest. Particularly desirable metallocenes are those selected from formulas 1 and/or 2 which when used alone to produce propylene homopolymer, are capable of producing an isotactic polymer having a weight average molecular weight of from about 25,000 to about 1,500,000 at commercially attractive temperatures of from about 50° C. to about 120° C. Preferably, two or more metallocenes are selected which produce polymers having different molecular weights. This results in a broader molecular weight distribution of the polymer.

The metallocenes used may show different molecular weight responses when in the presence of comonomer as will be described later in the Examples. This will also affect the molecular weight distribution of the product. For example, we have found that the incorporation of less than or equal to 1 wt % ethylene comonomer in one embodiment, from 1 to 5 wt % ethylene comonomer in another embodiment, during the polymerization process as described herein results in a substantial broadening of the molecular weight distribution at the high molecular weight end. This is unexpected since with both the individual metallocenes used, the molecular weight drops with ethylene addition.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution.

In one embodiment, the catalyst system used in the process of this invention comprises at least two metallocenes. The at least two metallocene is capable of producing propylene homopolymer at polymerization temperatures of from about 50° C. to about 100° C. having a molecular weight in the range of from 25,000 to 300,000, preferably from 100,000 to 300,000. The other metallocene is preferably capable of producing propylene homopolymer at the same temperature that has a molecular weight in the range of from 25,000 to 2,000,000 in one embodiment, 150,000 to 1,500,000 in another embodiment, and from 300,000 to 1,000,000 in yet another embodiment. Preferably, each metallocene produces a polymer component having a molecular weight distribution of less than 3, preferably less than 2.5.

In one embodiment of the invention the at least two metallocenes are selected from the group consisting rac-:
Dimethylsilandiylbis(2-methylindenyl) zirconium dichloride,
Dimethylsilandiylbis (2-methyl-4-phenyl-1-indenyl) zirconium dichloride,
Dimethylsilandiylbis(2,4-dimethylindenyl) zirconium dichloride,
Dimethylsilandiylbis(2,5,6-trimethylindenyl) zirconium dichloride,
Dimethylsilandiylbis indenyl zirconium dichloride,
Dimethylsilandiylbis(4,5,6,7-tetrahydroindenyl) zirconium dichloride,
Dimethylsilandiylbis(2-methyl-4,5-benzoindenyl) zirconium dichloride,
Dimethylsilandiylbis (2-methyl-4-phenyl-1-indenyl) zirconium dimethyl,
Dimethylsilandiylbis(2-methyl-4,5-benzoindenyl) zirconium dimethyl,
Dimethylsilandiylbis(2-methyl-4,6-diisopropylindenyl) zirconium dimethyl,
Dimethylsilandiylbis(2-ethyl-4-phenyl-1-indenyl) zirconium dimethyl,
Dimethylsilandiylbis (2-ethyl-4-naphthyl-1-indenyl) zirconium dimethyl,
Phenyl(methyl)silandiylbis(2-methyl-4-phenyl-1-indenyl) zirconium dimethyl,
Dimethylsilandiylbis(2-methyl-4-(1-naphthyl)-1-indenyl) zirconium dimethyl,
Dimethylsilandiylbis(2-methyl-4-(2-naphthyl)-1-indenyl) zirconium dimethyl, and
Dimethylsilandiylbis(2-methyl-indenyl) zirconium dimethyl.

In one embodiment, at least one metallocene is a 4-phenyl-1-indenyl substituted metallocene such as dimethylsilandiylbis (2-methyl-4-phenyl-1-indenyl) zirconium dichloride and phenyl(methyl)silandiylbis(2-methyl-4-phenyl-1-indenyl) zirconium dimethyl.

The ratio of metallocenes used in polymerization will depend partly on the activities of the metallocenes and on the desired contribution of each. Thus, for example, if two metallocenes are used in a 1:1 ratio and the activities of each are similar, then the polymer product will be expected to comprise 45–55% of polymer produced by one metallocene and 55–45% of polymer produced by the other. The breadth of the product's molecular weight distribution will depend at least partly on the difference in molecular weight capability between the metallocenes. The addition of comonomer and/or hydrogen in the polymerization process may affect the contribution of each metallocene as described in detail below.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes are preferably used as activators, most preferably methylalumoxane (MAO). Generally, the alkylalumoxanes preferred for use in olefin polymerization contain from 5 to 40 of the repeating units:

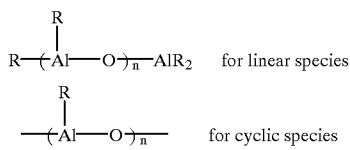

where R is a $C_1$–$C_8$ alkyl including mixed alkyls. Particularly preferred are the compounds in which R is methyl. Alumoxane solutions, particularly methyl alumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, and 5,103,031; and BP-A-0 561 476, EP-B 1-0 279 5 86, EP-A-0 594-218 and WO 94/10180. (as used herein unless otherwise stated "solution" refers to any mixture including suspensions.)

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat. No. 5,157,137, for example, discloses a process for forming clear, gel-free solutions of alkylalumoxane by treating a solution of alkylalumoxane with an anhydrous salt and/or hydride of an alkali or alkaline earth metal.

Ionizing activators may also be used to activate metallocenes. These activators are neutral or ionic, or are compounds such as tri(n-butyl)ammonium tetrakis (pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, WO 94/07928. The preferred activator anion neutral precursors that serve as the Lewis acid (LA) are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., tris perfluorophenyl boron, tris perfluoronaphthylboron, tris perfluoro biphenyl boron. In one embodiment, these precursors do not possess any reactive ligands which can be protonated by the hydroxyl groups of the metal oxide (the silanol group proton). For example, any Group 13 element based Lewis acids having only alkyl, halo, alkoxy, and/or amido ligands, which are readily hydrolyzed in aqueous media, are not suitable. At least one ligand of LA must be sufficiently electron-withdrawing to achieve the needed acidity, for example, trisperfluorophenyl boron, under typical reaction conditions.

Typical metal/metalloid centers for LA will include boron, aluminum, antimony, arsenic, phosphorous and gallium. Most preferably LA is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di (trifluoromethyl)phenyl)boron, tris(di-t-butylmethylsilyl) perfluorophenylboron, and other highly fluorinated trisarylboron compounds. Other suitable activators are disclosed by Chen and Marks, 100 *Chemical Reviews* 1392–1434 (2000); Yang et al., 116 *J. Am. Chem. Soc.* 10015–10031 (1994); Yang et al., 113 *J. Am. Chem. Soc.* 3623–3625 (1991); Chien et al. 113 *J. Am. Chem. Soc.* 8570–8571 (1991); Bochmann et al. 12 *Organometallics* 633–640 (1999); Herfert et al. 14 *Makromol. Chem., Rapid Commun.* 91–96 (1993); and in EP 0 704 463 and EP 0 513 380.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333. These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, EP-A-0 426 637 and EP-A-0 573 403. An additional method of making the ionic catalysts uses ionizing anion pre-cursors which are initially neutral Lewis acids but form the cation and anion upon ionizing reaction with the metallocene compounds, for example the use of tris (pentafluorophenyl) boron. See EP-A-0 520 732. Ionic catalysts for addition polymerization can also be prepared by oxidation of the metal centers of transition metal compounds by anion pre-cursors containing metallic oxidizing groups along with the anion groups, see EP-A-0 495 375.

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Support Materials

The catalyst systems used in the process of this invention are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

In one embodiment the support material is porous silica which has a surface area in the range of from 10 to 700 m$^2$/g, a total pore volume in the range of from 0.1 to 4.0 cc/g and an average particle size in the range of from 10 to 500 $\mu$m. Desirably, the surface area is in the range of from 50 to 500 m$^2$/g, the pore volume is in the range of from 0.5 to 3.5 cc/g and the average particle size is in the range of from 20 to 200 $\mu$m. In yet another embodiment, the surface area is in the range of from 100 to 400 m$^2$/g, the pore volume is in the range of from 0.8 to 3.0 cc/g and the average particle size is in the range of from 30 to 100 $\mu$m. The average pore size of typical porous support materials is in the range of from 10 to 1000 Å. Desirably, a support material is used that has an average pore diameter of from 50 to 500 Å, and from 75 to 350 Å in another embodiment. It may be desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432. Desirably, the metallocenes and activator are combined and their reaction product supported on the porous support material as described in U.S. Pat. No. 5,240,894 and WO 94/28034, WO 96/00243, and WO 96/00245. Alternatively, the metallocenes may be preactivated separately and then combined with the support material either separately or together. If the metallocenes are separately supported, then preferably, they are dried then combined as a powder before use in polymerization.

Regardless of whether the metallocenes and their activator are separately precontacted or whether the metallocenes and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in 1 Experimental Methods In Catalyst Research 67–96 (Academic Press 1968).

Methods of supporting ionic catalysts comprising metallocene cations and noncoordinating anions are described in WO 91/09882, WO 94/03506, WO 96/04319 and in co-pending U.S. Ser. No. 09/339,128, filed Jun. 24, 1999. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide or fluorided-modified supports such that the Lewis acid becomes bound to the support and a hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893.

Polymerization Processes

In one embodiment, the polymers of this invention are generally prepared in a multiple stage process wherein homopolymerization and copolymerization are conducted separately in parallel or, preferably in series. In one embodiment, propylene is homopolymerized and thereafter propylene and comonomer are copolymerized in the presence of the initially produced homopolymer using the above described metallocene catalyst systems. If, however, the copolymer is prepared first, the subsequently prepared "homopolymer" is likely to contain some traces of comonomer.

In another embodiment, the polymers of this invention are prepared in a single or multiple stage process wherein copolymerizations are conducted in parallel or, preferably, in series, or simply in a single stage. In one embodiment, propylene and comonomer are copolymerized using the above described metallocene catalyst systems.

Individually, each stage may involve any process including gas, slurry or solution phase or high pressure autoclave processes. In one embodiment, a slurry (bulk liquid propylene) polymerization process is used in each stage.

A slurry polymerization process generally uses pressures in the range of from about 1 to about 100 atmospheres (about 0.1 to about 10 MPa) or even greater and temperatures in the range of from about −60° C. to about 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system, comonomer and reaction conditions. In the case where TCR is desired, the propylene is be homopolymerized for a time period sufficient to yield a composition having from 10 to 90 wt % homopolymer based on the total weight of the polymer in one embodiment, from 20 to 80 wt % in another embodiment, and from 30 to 70 homopolymer wt % based on the total weight of the polymer in yet another embodiment. In the embodiment where an RCP is formed, the propylene and comonomer are copolymerized for a time period sufficient to yield a crystalline propylene copolymer wherein the wt % of the comonomer based on the total weight of the polymer is in the range from 0.05 to 15.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will influence the molecular weight distribution of the polymer product accordingly. A preferred TCR product form is to have the comonomer be present in the high molecular weight species of the total polymer to provide a favorable balance of good film stretchability without breaking, coupled with low extractables, low haze and good moisture barrier in the film. Accordingly in this case, the same or lower levels of hydrogen are utilized during copolymerization as were used during polymerization. In one embodiment, if the reactors in series are used, then the comonomer may be added to any reactor in the series, however, preferably, the comonomer is added to the second or subsequent reactor. In another embodiment, when a RCP is produced, if reactors in series are used, the comonomer should be added to each reactor in series.

Polymers

In one embodiment, the polymers of this invention are a reactor blend of crystalline propylene homopolymer and copolymer. The polymer comprises from 10 to 90 wt % homopolymer based on the total weight of the polymer in one embodiment, from 20 to 80 wt % in another embodiment, and from 30 to 70 wt % homopolymer based on the total weight of the polymer in yet another embodiment. In another embodiment, the polymers of the present invention are a crystalline propylene copolymer wherein the wt % of the comonomer based on the total weight of the polymer is in the range from about 0.05 to about 15, and from 0.5 to 10 in another embodiment.

As shown later in the Examples, a reactor blend of just crystalline propylene homopolymers made in the different polymerization stages, using a system of mixed metallocene catalysts, does provide an enhancement in film orientability and good film properties over the case of a propylene homopolymer made via a single metallocene catalyst. The homopolymer/copolymers in one embodiment and copolymers in an alternative embodiment of the invention, however, provide a more favorable balance of broad film processability range and rheological properties.

Any comonomer may be used to make the polymers of this invention. Preferably the comonomer is selected from the alpha-olefin group consisting of ethylene, 1-butene, 1-pentene, 1-hexene, and 1-octene. Combinations of comonomers and substituted comonomers such as 4-methylpentene-1 can also be used. The most preferred of these comonomers are ethylene, 1-pentene, and 1-hexene. Diolefins and cyclic olefins may also be used.

The amount of comonomer used will depend on the type of comonomer and desired properties. The final composition may contain any amount of comonomer as long as the components of the composition remain crystalline. In general the amount of comonomer units based on the total weight of the polymer is in the range of from 0.05 to 15 wt % in one embodiment, from 0.1 to 10 wt % in another embodiment, and from 0.5 to 8 wt % in yet another embodiment, and from 0.5 to 5 wt % based on the total weight of the polymer in yet another embodiment. Conversely, the polymer comprises from 99.95 to 85 wt % propylene units based on the total weight of the polymer in one embodiment, from 99.90 to 90 wt % in another embodiment, and from 99.5 to 92 wt % in yet another embodiment, and from 99.5 to 95 wt % propylene units based on the total weight of the polymer in yet another embodiment.

In one embodiment of the invention, a desirable feature of this composition is the presence of comonomer in the high molecular weight species, to selectively reduce the crystallinity and improve film orientability at stretching temperatures, while the homopolymer, higher crystalline component provides the desirable film properties such as stiffness and barrier. In an alternative embodiment of the invention, the desirable feature of the composition is that the presence of comonomer in the high molecular weight species are less than in the lower molecular weight species, thus improving film orientability at low stretching temperatures. The higher molecular weight crystalline components that contain less comonomer (or no comonomer) provide the desirable film properties such as stiffness and barrier strength. The polymers of this invention also retain the low extractables levels characteristic of single-site metallocene-based polymers, which are typically under 2 wt %, as measured by 21 CFR 177.1520(d)(3)(ii). As will be shown later in the Examples, the polymers of this invention combine the stiffness and barrier properties of homopolypropylene with the enhanced low temperature stretchability, without breaks, of a random copolymer.

The propylene polymers of this invention are particularly suitable for oriented and non-oriented film applications and preferably have a weight average molecular weight (MW) that is in the range of from about 25,000 to about 1,500,000 in one embodiment, from about 100,000 to about 1,000,000 in another embodiment, from about 140,000 to about 750,000 in another embodiment, from about 150,000 to about 500,000 in another embodiment, and from about 200,000 to about 400,000 in yet another embodiment. The Mz values for the polymers of the present invention range from 400,000 to 2,000,000 in one embodiment, from 500,000 to 1,500,000 in another embodiment, and from 600,000 to 800,000 in yet another embodiment.

These polymers have a melt flow rate (MFR) that is in the range of from 0.2 dg/min. to 30 dg/min. in one embodiment, from 0.5 dg/min. to 20 dg/min. in another embodiment, and from 1 dg/min. to 10 dg/min in yet another embodiment. The polymers of this invention have a broadened molecular weight distribution as compared to polymers prepared with only one type of metallocene catalyst. The polymers have a molecular weight distribution ($M_w/M_n$) in the range of from 2.1 to 10.0 in one embodiment, and from 2.5 to 7.0 in another embodiment.

The TCR polymers of this invention will have a tailored composition distribution reflecting their homopolymer/ copolymer makeup and the presence of the component contributions from each of the metallocenes used. The RCP polymers of this invention will have a tailored composition distribution reflecting their copolymer makeup and the presence of the component contributions from each of the metallocenes used. The copolymer species derived from each metallocene will be narrow in composition distribution, typical for single site metallocene-based polymers. The final composition distribution will depend on the level of comonomer, the ratio of homopolymer (when present) to copolymer produced and the comonomer incorporating tendencies of the individual metallocenes. The design of the molecular weight distribution, tacticity distribution, and composition distribution of the final composition depends on the requirements of the targeted end application.

The polymers of this invention can be blended with other polymers, particularly with other polyolefins. Examples of such would be blends with conventional propylene polymers.

Films

The crystalline isotactic propylene polymers of this invention exhibit exceptional film orientability and the films exhibit a good balance of properties. Any film fabrication method may be used to prepare the oriented films of this invention as long as the film is oriented at least once in at least one direction. Typically, commercially desirable oriented polypropylene films are biaxially oriented sequentially or simultaneously. The most common practice is to orient the film first longitudinally and then in the transverse direction. Two well known oriented film fabrication processes include the tenter frame process and the double bubble process.

We have found that the novel structure of the crystalline propylene compositions of this invention translates to distinct differences versus standard films made with today's ZN produced propylene polymers and compared with films produced with a single metallocene. As discussed in more detail below, biaxial stretching studies show that the films of this invention have a substantially broader processability range and can be evenly stretched at lower temperature. Stretching studies at elevated temperatures on cast sheets along machine direction (MD) and transverse direction (TD) indicate that the films of this invention stretch easily without breaking at lower stretching temperatures when compared to ZN produced propylene polymers. This indicates a capability to operate at significantly higher line speeds on commercial tenter frame lines, while still making oriented films having good clarity, stiffness and barrier properties.

The final films of this invention may generally be of any thickness, however, preferably the thickness is in the range of from 1–200 um, from 2–150 µm in another embodiment, and from 5 to 75 µm in another embodiment. There is no particular restriction with respect to draw ratio on film stretching, however, preferably the draw ratio is from about 4 to about 10 fold for monoaxially oriented films and from about 4 to about 15 fold in the transverse direction in the case of biaxially oriented films. Longitudinal (MD) and transverse stretching is desirably carried out at a temperature in the range of from about 70° C. to about 200° C., desirably from about 80° C. to about 190° C. The films may be coextruded or laminated and/or may be single or multi layered with the film of the invention comprising at least one component of the layers, typically the core layer.

The crystalline propylene polymers of this invention are also very suitable for non-oriented film which can be fabricated using cast or blown film process technology. Like the oriented film, the non-oriented film can also be coextruded or laminated and/or may be single or multi layered with the film of the invention comprising at least one component of the layers.

Additives may be included in the film polymers of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application. In addition, hydrogenated and/or petroleum hydrocarbon resins may be used as additives.

The film surfaces may be treated by any of the known methods such as corona or flame treatment. In addition standard film processing (e.g. annealing) and converting operations may be adopted to transform the film at the line into usable products.

Test Methods

Test methods are listed in the appropriate tables below. Other testing and procedural methods include the following: MFR was determined via the method of ASTM D 1238 Condition L. The melting temperature was determined from peak temperatures from DSC runs at 10° C./min. heating and cooling rates. Comonomer content was determined via FTIR measurements (calibrated versus $^{13}$C NMR). Percent hexane extractables level was determined via 21 CFR §177.1520 (d)(3)(i) and (ii). Percent TREF extractables level was determined during TREF (Temperature Rising Elution Fractionation) and represents an alternate method to quantify the generally low molecular weight, high comonomer-containing species that are prone to be migratory and extractable. In the TREF experiment (ExxonMobil Chemical Company method; see Wild et al., 20 *Journal of Polymer Science, Polymer Physics Edition* 441 (1982); U.S. Pat. No. 5,008,204; and WO 93/03093) these species are the ones that do not crystallize at 0° C. but remain in the solvent at this temperature. While the absolute levels of hexane and TREF extractables will be different, the two methods provide similar trend data. The isotactic index was determined by the method of $^{13}$C NMR spectroscopy as disclosed in EP 0 747 212. Molecular weights (Mn, Mw, Mz) were determined by Gel Permeation Chromatography (GPC), a well known analytical procedure to quantify molecular weight data. The polydispersity index was also determined by dynamic shear rheometer as discussed by Drickman et al., 9 *Journal of Plastic Film and Sheeting* 22 (1993).

Additional biaxial stretching measurements using an Instron machine (Model 1122) were conducted on a similar set of polymers analyzed via T. M. Long stretching. The key difference is the simultaneous biaxial stretching provided by the T. M. Long machine versus a sequential stretching provided by the Instron machine, similar to the operation of a typical commercial tenter frame machine.

The stretching measurements on the Instron were conducted as follows: Cast extruded sheet (typically 600 µm thick) was cut along the machine direction (MD) into strips 76.2 mm wide. A strip was gripped between the jaws on the Instron. An appropriate length of strip was cut to allow a jaw separation of 25.4 mm. The sample was maintained in an environmental chamber on the Instron at a temperature of 110° C. The temperature thermocouple probe was positioned adjacent to the sample. The sample was stretched to 700% along the MD in the Instron at a temperature of 110° C. and a stretching rate of 50.8 mm/min. After the MD stretching, the sample was held at 700% extension while the chamber doors were opened and the sample allowed to cool down to ambient temperature. The sample (about 100 μm thick) was removed from the chamber and cut along the original transverse direction (TD) into 25.4 mm wide strips. A strip of appropriate length was again gripped between jaws on the Instron. Two different TD stretching conditions were used.

Case 1: 25.4 mm jaw separation, 1,100% TD stretching ratio, 508 mm/min. stretching speed, different stretching temperatures varying from 100° C. to 150° C. The strain rate for this stretching condition is about 2,200% per minute.

Case 2: 12.7 mm jaw separation, 2,200% TD stretching ratio, 1270 mm/min. stretching speed, different stretching temperatures varying from 120° C. to 160° C. The strain rate for this stretching condition is about 11,000% per minute.

Heat seal strength (Table 10B) was measured on a Theller film Sealer (model PC) at the temperature shown in the tables. After conditioning at 23° C. for 24 hours, seal strengths were measured using a United six station machine. Sealing conditions were 206.8 kPa seal pressure, 0.5 second seal dwell time, 2.54 cm wide film strips, 3 test specimens per sample, 50.8 cm per minute test speed.

Shrink tension force (Table 12) was determined by mounting a film strip, 2.54 cm wide and cut along the MD, in the jaws of an Instron machine (Model 1122). The separation of the jaws was 5.08 cm. An environmental chamber surrounded the jaws. The chamber space could be heated and controlled to desired temperatures to induce shrinkage and the associated shrink tension force in the film samples. Experiments were conducted at a temperature of 110° C. The film strips were mounted taut at ambient temperature following which the environmental chamber was closed and the temperature raised to 110° C. Once the test temperature was reached, the test was continued for 20 minutes at this temperature. The tension force developed in the film from the time of initial loading was recorded on a strip chart recorder. The final leveled-out force reading when the film had equilibrated at 110° C. was taken as the shrink tension force at that temperature (g force). Two runs per sample were conducted at 110° C. to check reproducibility and average the data.

Film processability determined as follows: Samples were stretched on TM Long stretching apparatus; MD×TD stretching ratio=6×6; preheat time 27 sec; stretch rate 76.2 mm/sec; the initial sheet thickness was about 600 μm; the final stretched film thickness was about 20 μm, wherein E=Even stretch, U=Uneven stretch (i.e., unstretched marks/unstretched regions), B=Break, S=Sagging (abbreviations in the Tables). Films for testing of film properties were prepared on the TM Long stretching apparatus at 143.3° C.; MD×TD stretching ratio=6×6; preheat time 27 sec. Film thickness was determined using a profilometer; Haze was measured per ASTM D 1003; Gloss per ASTM D 2457; WVTR (water vapor transmission rate) per ASTM F 372; Tensile properties and 1% secant modulus was measured per ASTM D 882.

EXAMPLES

Samples 1–9

Samples 1–9, data for which is in Tables 1–6, are discussed below and exemplify the case of having a dual metallocene combination to form a crystalline polypropylene composition that is a TCR. Samples 1, 2A and 2B are propylene polymers consistent with this invention. These were compared against several metallocene-based and conventional Ziegler-Natta (ZN) based propylene polymers as follows. Sample 3 was prepared from the same metallocene catalyst system (comprising two metallocenes) used to make Samples 1, 2A and 2B, but without using any comonomer. Samples 4 and 5 were prepared from a single metallocene-based catalyst; Sample 4 is a homopolymer, while Sample 5 contains ethylene as comonomer. The ZN produced propylene polymers are Samples 6, 7, 8 and 9. Samples 6 and 9 are polymers of controlled crystallinity, comprising a reactor blend of propylene homopolymer and propylene copolymer, similar to the invention polymers but prepared from conventional ZN catalyst. Product PP4792 E1 is an example of Sample 6. Product PP4782, at a slightly lower MFR (2.1 versus 2.6 for PP4792 E1) is an example of Sample 9. Samples 7 and 8 are conventional random copolymer polypropylenes. Products PP 4822 and PD 9012 E1 are examples of Samples 7 and 8 respectively. The ZN products above (Samples 6, 7, 8 and 9) are available commercially from ExxonMobil Chemical Company, Houston Tex., USA. Table 1A and Table 1B provides characterization data describing Samples 1 to 9. The term "2 MCN" refers to the case where two metallocene catalyst systems are used. The individual metallocenes themselves can be the same or different.

The copolymer, Sample 1, was prepared by using a catalyst system that employed an equimolar mix of two metallocenes on a silica support. The catalyst system was prepared as follows. In an inert nitrogen atmosphere, 8.0 g of rac dimethylsilanediylbis(2-methyl-4-phenylindenyl) zirconium dichloride was combined with 6.0 g of dimethylsilanediylbis(2-methyl-indenyl)zirconium dichloride and 780 g of 30 wt % methylalumoxane solution in toluene (Albemarle Corporation, Baton Rouge, La.). 860 g of toluene was added to dilute the solution. Separately 939 g MS948 silica (1.6 cc/g pore volume—available from Davison Chemical Division of W. R. Grace, Baltimore, Md.) previously dehydrated to 600° C. in a stream of flowing nitrogen was charged to the catalyst preparation vessel. With the agitator on the metallocene—aluminoxane solution was added to the silica. After addition of the solution mixing continued for one hour and then vacuum was applied to the vessel. A slight nitrogen purge was added to the bottom of the vessel to aid in removing the volatiles. At the end of drying 1454 g of free flowing solid was obtained. Analysis showed a loading of 8.95 wt % Al and 0.17 wt % Zr with an Al/Zr molar ratio of 180.

Several batches of the catalyst system were combined to provide sufficient charge for the polymerization run. The catalyst system was oil slurried (20 parts by weight to 80 parts by weight Drakeol™ 35 available from Penreco, Dickinson, Tex.) for ease of addition to the reactor.

The procedure for polymerizing Sample 1 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 5 g/hr. Triethylaluminum (TEAL) was employed as scavenger and fed at a rate of 160 ml/hr of a 2 wt % solution of TEAL in hexane solvent. Propylene was fed at a rate of about 73 kg/hr to the first reactor and about 27.5 kg/hr to the second reactor. Ethylene comonomer was added only to the second reactor at a feed rate as needed to result in an overall incorporation of about 0.8 wt % ethylene in the final polymer. Hydrogen was added for molecular weight control at 500 mppm in the first reactor. No addition of fresh hydrogen was fed to the second reactor. Residence times were about 2.75 hours in the first reactor and about 2 hours in the second reactor. The production rate of polymer was about 32 kg/hr. The polymer was discharged from the reactors as a granular product having an MFR of about 2.0 dg/min. and ethylene level of about 0.8 wt %. Evaluation of the intermediate product from the first reactor showed a homopolypropylene with an MFR of 4.0.

The copolymer, Sample 2A, was prepared using the same catalyst system and polymerization procedure as described above for Sample 1. The only difference was a slight increase in the ethylene comonomer feed to the second reactor, resulting in an overall ethylene incorporation in the final product of about 1.0 wt %. The final granular product had an MFR of about 1.0; that of the intermediate product from the first reactor about 4.0. Both polymers, Samples 1 and 2A, comprise a reactor blend of a high(er) MFR homopolypropylene with a low MFR random copolymer.

The copolymer, Sample 2B, was prepared using a similar catalyst system and polymerization procedure as described above for Samples 1 and 2A, with some modifications. On catalyst, MS 952 silica (Davison Chemical, Division of W. R. Grace, Baltimore, Md.), previously dehydrated to 600° C. under nitrogen was used instead of MS 948. Also, following the addition of the metallocene/alumoxane mixture to the silica, a solution containing Kemamine AS-990 (Witco Corporation, Greenwich, Conn.) in toluene (1 wt % of AS-990 based on weight of silica) was added to the slurry before drying. On reactor polymerization, the reactor levels were adjusted to provide a 70%/30% split between product made in the first and second reactors, versus a 55%/45% split during the production of Samples 1 and 2A.

The homopolymer, Sample 3, was also prepared using the two-metallocene mix described above. Several batches of the catalyst were combined to provide the charge for the polymerization run. The catalyst system was oil slurried (15 wt %) for ease of addition to the reactor.

The procedure for polymerizing Sample 3 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 13.5 g/hr. Triethylaluminum (TEAL) was employed as scavenger and fed at a rate of 2 ml/min. of a 2 wt % solution of TEAL in hexane solvent. Propylene was fed at a rate of about 65.8 kg/hr to the first reactor and about 27.2 kg/hr to the second reactor. Hydrogen was added for molecular weight control at 500 mppm in the first reactor and 900 mppm in the second reactor. Residence times were about 3 hours in the first reactor and about 2 hours in the second reactor. The production rate of polymer was about 25 kg/hr. The final polymer was discharged from the reactors as a granular homopolymer product having an MFR of 2.0 dg/min.

The homopolymer, Sample 4, was prepared using the metallocene catalyst system rac dimethylsilylbis(2-methyl-4-phenylindenyl)zirconium dichloride, activated with methylalumoxane and supported on silica. The catalyst system was prepared in the following manner.

A precursor solution was prepared by combining 343 g of 30 wt % methylalumoxane in toluene (Albemarle Corp., Baton Rouge, La.) representing 1.76 moles Al with 6.36 g of dimethylsilylbis(2-methyl-4-phenyl-indenyl)zirconium dichloride (0.01 moles Zr) by stirring. Then 367 g of toluene was added and stirring was continued for 15 minutes. The precursor solution (625.9 g) was added to 392 g of Davison MS 948 silica (1.6 cc/g pore volume—available from W. R. Grace, Davison Chemical Division, Baltimore, Md.) previously heated to 600° C. under nitrogen. The ratio of liquid volume to total silica pore volume was 1.10. The solid had the consistency of damp sand and was dried at reduced pressure (483 mm Hg vacuum) and temperatures as high as 50° C. over 16 hours. 485.5 g finely divided, free-flowing solid catalyst were obtained. Elemental analysis showed 0.09 wt % Zr and 7.37 wt % Al.

Several batches of catalyst system were combined to provide the charge for the polymerization run. The catalyst system was oil slurried (Drakeol™, 15 wt %) for ease of addition to the reactor. The procedure for polymerizing Sample 4 was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as a scavenger at a rate of 1.6 g/hr. The catalyst system prepared above was fed as a 15% slurry in mineral oil and was flushed into the reactor with propylene. Propylene monomer was fed to the first reactor at a rate of 73 kg/hr and to the second reactor at a rate of 27 kg/hr. Reactor residence time was about 2.3 hours in the first reactor and about 1.7 hours in the second reactor. Polymer production rates were about 16 kg/hr in the first reactor and 8 kg/hr in the second reactor. Polymer was discharged from the reactors as granular product having a MFR of 4.3 dg/min.

The copolymer, Sample 5, was prepared using the metallocene catalyst system rac-dimethylsilanediylbis(2-methyl-4,5-benzo-indenyl)zirconium dichloride, activated with methylalumoxane and supported on silica. The catalyst system was prepared in the following manner.

A precursor solution was prepared by combining 837.4 g of 30 wt % methylalumoxane in toluene (Albemarle Corp., Baton Rouge, La.) representing 4.31 moles Al with 8.45 g of dimethylsilanediylbis(2-methyl-4,5-benzo-indenyl) zirconium dichloride (0.015 moles Zr) by stirring. Then 249 g of toluene was added and stirring was continued for 15 minutes. The precursor solution was added to 783 g of Davison MS948 silica (1.6 cc/g pore volume—available from W. R. Grace, Davison Chemical Division, Baltimore, Md.) previously heated to 600° C. under nitrogen. The ratio of liquid volume to total silica pore volume was 0.95. The solid appeared dry and free flowing. The volatiles were removed by drying at reduced pressure (737 mm Hg vacuum) and temperatures as high as 65° C. over 24.5 hours. 1056 g finely divided, free-flowing solid catalyst were obtained. Elemental analysis showed 0.13 wt % Zr and 12.14 wt % Al.

Several batches of this catalyst system were combined to yield the charge required for the polymerization run. Prior to using for polymerization, 2 wt % Kemamine AS 990 (available from Witco Corp., Greenwich Conn.), was added to the catalyst dry solids. The catalyst was then oil slurried (Drakeol™, 15 wt %) for ease of addition to the reactor.

The procedure for polymerizing Sample 5 was as follows. The polymerization of propylene/ethylene copolymer was conducted in a pilot scale continuous, stirred tank, bulk liquid phase polymerization process employing two reactors in series. The reactors were equipped with jackets for removing the heat of polymerization. The reactor temperature was set at 55° C. in the first reactor and 51° C. in the second reactor. Catalyst was fed at rate of 9.2 g/hr. Triethylaluminum (TEAL) was employed as scavenger and fed at a rate of 2.25 ml/min. of a 2 wt % solution of TEAL in hexane solvent. Propylene was fed at a rate of about 99.8 kg/hr. Ethylene was used as a comonomer and its flow rate adjusted to provide an incorporation level of about 1.0 wt %. Residence times were about 3 hours in the first reactor and about 2.2 hours in the second reactor. The production rate of polymer was about 13.6 kg/hr. The polymer was discharged from the reactor as a granular product having an MFR of 3.9 dg/min. and a comonomer content of 1.1 wt % ethylene.

The molecular weight distributions of the metallocene-based polymers (Samples 1–5) are shown in FIG. 1. The GPC plots are of relative area versus molecular weight. The recovery compliance number (in FIGS. 1 and 2) tracks the high end of the distribution and are in units of $Pa^{-1} \times 10^{-4}$. Compliance is measured at about 200° C. using an ExxonMobil Chemical Company method described further below. Samples 4 and 5 are derived from a single metallocene-based catalyst, while Samples 1, 2A, 2B and 3 are derived from a two metallocene-based catalyst. Samples 4 and 5 (homopolymer and ethylene copolymer respectively) show characteristically narrow molecular weight distributions, typical of single site metallocene catalyzed polymers. No differences in molecular weight distribution are observed between homopolymer Sample 4 and ethylene copolymer Sample 5. Of the two-metallocene catalyzed polymers, homopolymer Sample 3 shows a modestly broadened molecular weight distribution, reflecting contributions from the two individual metallocenes.

Surprisingly, the invention polymers, Samples 1, 2A and 2B show an unexpected bimodal molecular weight distribution. The incorporation of less than or equal to 1 wt % ethylene comonomer during the polymerization process results in a substantial broadening of the molecular weight distribution at the high molecular weight end. This is unexpected since with both the individual metallocenes, molecular weight drops with ethylene addition.

Figure 2:
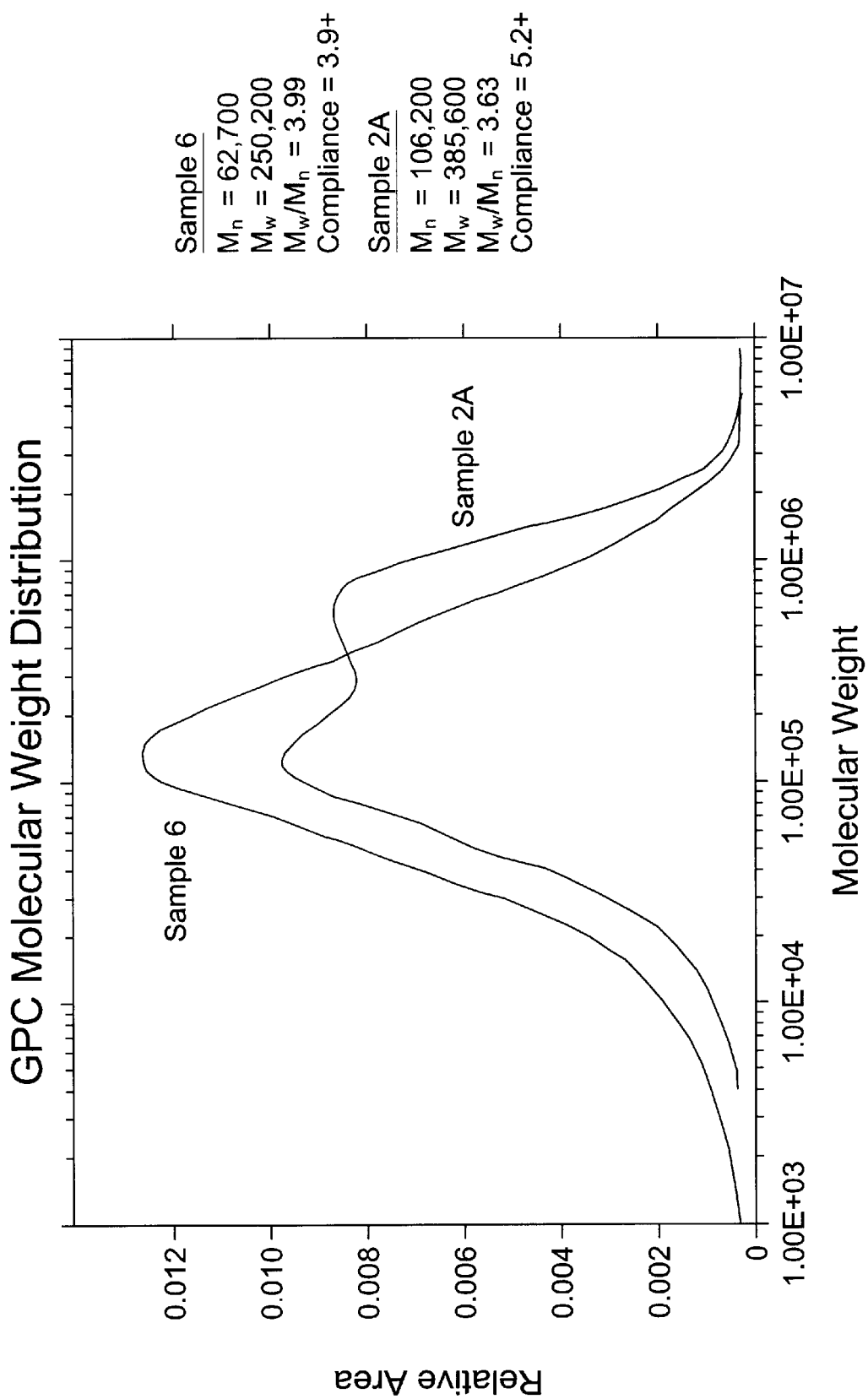
FIG. 2 is a GPC Molecular Weight Distribution plot of Samples 2A and 6.

A comparison of the molecular weight distribution of an invention polymer (Sample 2A) versus one made by the same process (i.e., addition of ethylene comonomer in a separate polymerization stage) but using a conventional ZN catalyst (Sample 6) is shown in FIG. 2. The extent of molecular weight broadening to the high end for the invention polymer is clearly visible.

This substantial molecular weight broadening at the high molecular weight end for the invention polymers can be characterized by several techniques, one of which is the measurement of recoverable compliance (see, e.g., FIGS. 1 and 2), the value of which is well known to track the high molecular weight end species of the distribution. Recoverable compliance is measured using a Rhemetric Stress Rheometer. A sample of polymer is melted at 200° C., $1 \times 10^4$ dyne/cm$^2$ stress for 180 seconds. Then the stress is released to zero to allow the polymer to recover the deformation. The recoverable compliance is the strain normalized by the stress recovery. The compliance values for the Samples are observed to increase from $1.1 \times 10^4$ $Pa^{-1}$ for Sample 4 (single metallocene; homopolymer) to $3.6 \times 10^4$ $Pa^{-1}$ for Sample 3 (two metallocenes; homopolymer) to greater than or equal to 3.9 for invention polymers Samples 1, 2A, and 2B (two metallocenes; copolymer). The recoverable compliance for Samples 10 and 11 are, respectively, $3.63 \times 10^4$ $Pa^{-1}$ and $4.3 \times 10^4$ $Pa^{-1}$.

The incorporation of ethylene in the invention polymers, believed to occur primarily in the larger molecules, broadens the melting distribution as is seen in the DSC melting data shown in FIG. 3 which compares invention polymer, Sample 2A, with metallocene control, Sample 4, and ZN control, Sample 6. Melting traces were performed on a Perkin Elmer DSC 7 Differential Scanning Calorimeter. Single site metallocene-based catalysts are known to provide uniform comonomer incorporation among all the molecules in a polymer sample and to allow greater melting point depression than conventional ZN based catalysts for the same comonomer incorporation level. Even with the greater level of ethylene incorporation in the invention polymers versus comparable ZN controls (0.8 and 1.0 wt % in Samples 1 and 2A versus 0.55 and 0.4 wt % in Samples 6 and 7), the extractables levels in the invention polymers are lower, reflecting their single site catalyzed origin (Table 1A).

The invention polymers (Samples 1, 2A and 2B), two metallocene-catalyzed controls (Samples 3 and 4) and two ZN catalyzed controls (Samples 6 and 7) were converted to biaxially oriented films to assess ease of stretching and orientation. This step is recognized to be the critical point in the fabrication of such oriented films. One of the procedures adopted was one that is widely used in the art and involved cast extrusion of a sheet of polymer (typically 500 µm to 650 µm thick) followed by biaxial orientation at elevated temperature on a stretching apparatus such as a film stretcher from the TM Long Co., Somerville, N.J. (henceforth referred to as TM Long machine) to yield a final thickness of 15 µm to 25 µm. Ease of film stretching or orientation was judged from the uniformity of stretching (i.e., even stretch versus the presence of stretch bands), film sagging and in the most severe case, film breakage. A desired stretching profile is one that offers even stretching, without any stretch bands, breakage or sagging over a wide range of stretching temperatures. The stretching performance for the selected polymers are summarized in Table 2. The single metallocene catalyzed homopolymer Sample 4 shows poor stretchability. The two metallocene homopolymer, Sample 3, shows an improvement, though it is not as good as the invention polymers, Samples 1, 2A and 2B, which show a desirably broad stretching window. The performances of Samples 2A and 2B are seen to be superior to those of the ZN controls, Samples 6 and 7.

Figure 4A:
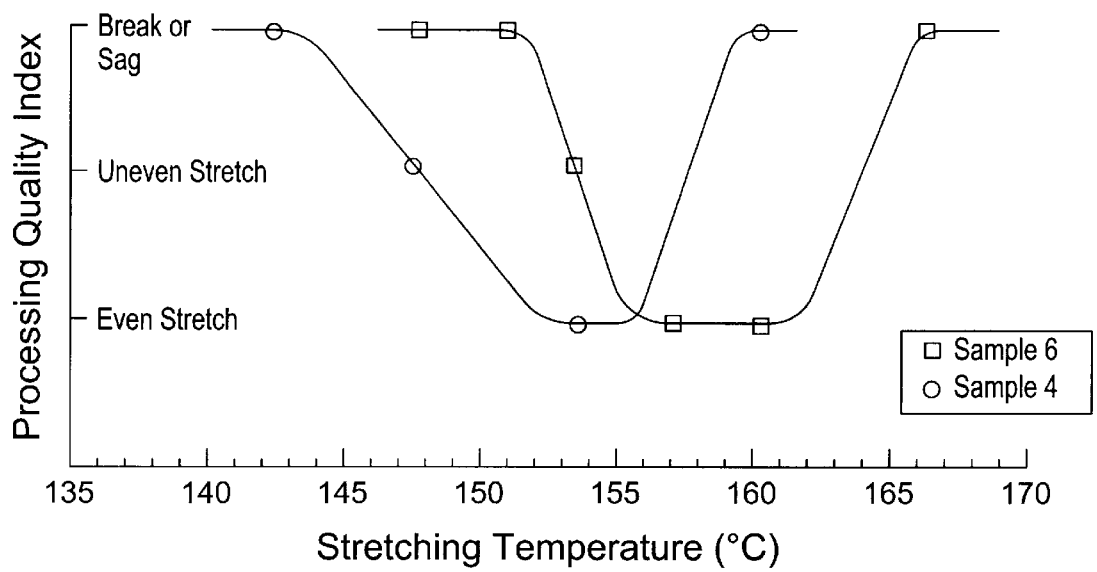
FIGS. 4A and 4B are Processing Window During Biaxial Stretching plots of Samples 2A, 4, and 6.
Figure 4B:
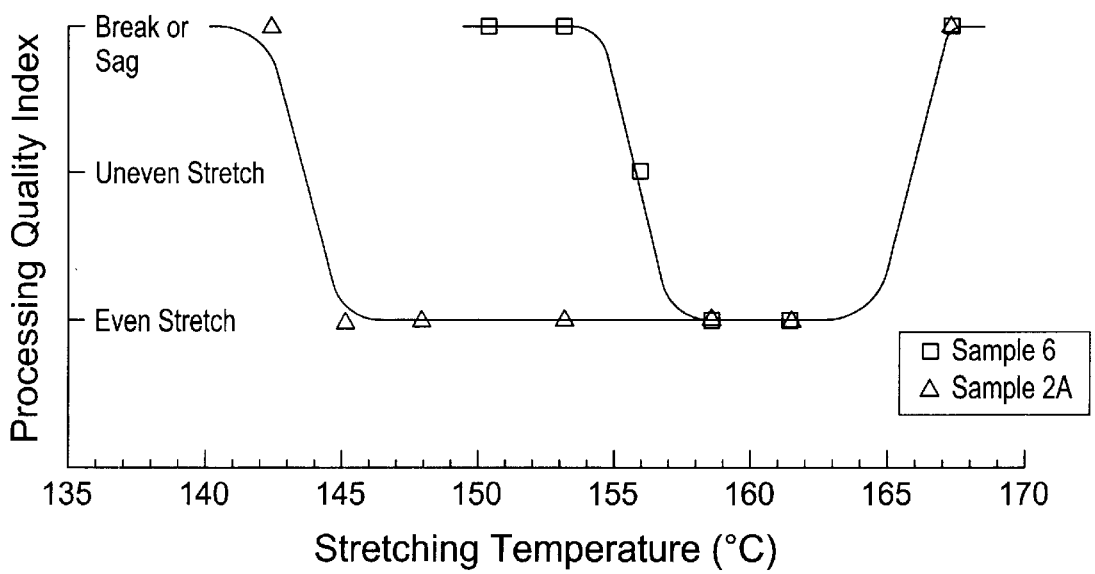

Graphical representations of the comparative processability ranges for the different samples are shown in FIG. 4. A curve having as wide a well as possible would be reflective of a polymer of good processing latitude. FIG. 4A compares the standard metallocene single site-based polymer Sample 4 versus the ZN control Sample 6. The lower melting, narrowly distributed polymer Sample 4 can be processed at lower temperature than control Sample 6, but it is seen to have poor processing latitude with stretching temperature. FIG. 4B compares the same ZN control Sample 6 against metallocene polymer, Sample 2A, the invention polymer. The processability range for Sample 2A is now seen to be quite a bit broader, particularly at low stretching temperatures, reflecting very favorable processing latitude.

Film property measurements on some of the biaxially stretched films produced above are shown in Table 3. The properties of the invention polymer films compare favorably with the ZN control. The ZN film has slightly higher film stiffness. It has been found that the stretching temperature for optimum film properties (low haze, maximum stiffness) for the invention polymers is lower than that used typically for the ZN control film. As seen in Table 3, the haze and modulus of the Sample 2A film are both improved on going from 154.4° C. stretching temperature to 143.3° C.

To attain such lower stretching temperatures with today's ZN polymers, one can use random copolymers of similar melting temperature to the invention polymers. This was done using Sample 8, a 2 MFR, 2.8 wt % ethylene random copolymer with Tm=146° C., the same as invention polymers Samples 1, 2A and 2B. Biaxially oriented film was prepared from Sample 8 by extruding cast sheet and stretching it at the lower temperature of 143.3° C. on the TM Long stretching apparatus. Film properties on stretched films of Sample 8 are compared versus those for Sample 2A in Table 4. The film properties profile displayed by the random copolymer Sample 8 is seen to be deficient to that of the invention polymer. Film stiffness, moisture barrier and tensile properties are all lower than those for the invention polymer. The film data demonstrate the unique balance of favorable film stretchability coupled with good film properties for the invention polymer.

Not all the samples were able to endure these TD stretching conditions and remain unbroken. Breaks were noted down in the data measurements when they occurred, along with the tensile strengths at 1,100% and 2,200% stretch ratios if unbroken. Two test specimens per polymer sample were evaluated at each stretching condition; values reported are averages for the two specimens.

TD stretching data per the testing conditions of Case 1 above are shown in Table 5. Table 5 shows the TD tensile strengths at 1,100% stretching ratio, and the break points for those samples that broke prior to achieving this stretching level. For all the samples, the propensity to break before reaching 1,100% TD stretching is greater at the lower temperatures. The superiority of the invention polymers is clearly seen in the data. They withstand breaking much better than either the metallocene controls (Samples 3 and 4) or the ZN controls (Samples 6 and 7). One has to go down to a stretching temperature of 110° C. (25° C. lower than the best of the control samples) before a break is noted in the invention polymer films. Also, when comparing samples at temperatures where breakage does not occur (see data at 150° C., for example), the invention polymer films (Samples 1 and 2A) show lower tensile strengths (i.e. easier stretchability) at 1,100% stretch ratio. Easier TD stretchability at lower stretching temperatures, without breaking, is one of the unique features offered by the invention polymers. Since film breaks during TD stretching are typically the weak link in biaxially oriented polypropylene film fabrication, via the tenter frame process, the invention polymers offer a significant processing advantage.

A typical commercial tenter frame process to make biaxially oriented polypropylene film, operating at 250 m/min. line speed and with TD stretch ratio 850% (i.e. 1 m wide film stretched to 8.5 m), has a TD-stretch strain rate of about 15,000% per minute. While it is difficult to match this value in a laboratory test, the Instron TD stretch test conditions of Case 2 above provide a strain rate of 11,000% per minute, which approaches that of the commercial fabrication process. Data measurements per Case 2 conditions are shown in Table 6. The results are the same as those noted earlier: Low TD tensile strength values and no film breaks for the invention polymers down to stretching temperatures 30° C. lower (130° C. versus 160° C.) than the best of the ZN control samples. At high TD strain rates, approaching those encountered during commercial tenter frame processing, the invention polymers display better low temperature TD stretchability without breaking.

Testing of the processability of the invention polymers during biaxially oriented film fabrication via the tenter frame process, was conducted on a pilot line capable of 1 m wide trimmed films. The preparation of such films is readily done using techniques well known in the art. Invention polymer Sample 2B was compared against ZN control Sample 9. Typical values set for some key processing parameters were:

| Parameter | Sample 9 (2.1 MFR, 159° C. Tm) | Sample 2B (1.7 MFR, 147° C. Tm) | Sample 10 (2.6 MFR, 144° C. Tm) |
| --- | --- | --- | --- |
| Extrusion Melt Temperature | 279° C. | 272° C. | 263° C. |
| MD Oven Temperature | 135° C. | 122° C. | 122° C. |
| MD Stretching Ratio | 5.0 | 5.1 | 5.1 |
| TD Oven Temperature | 182° C. | 166° C. | 168° C. |
| TD Stretching Ratio | 7.7 | 7.7 | 7.7 |
| Film Thickness | 20 µm | 20 µm | 20 µm |

Figure 5:
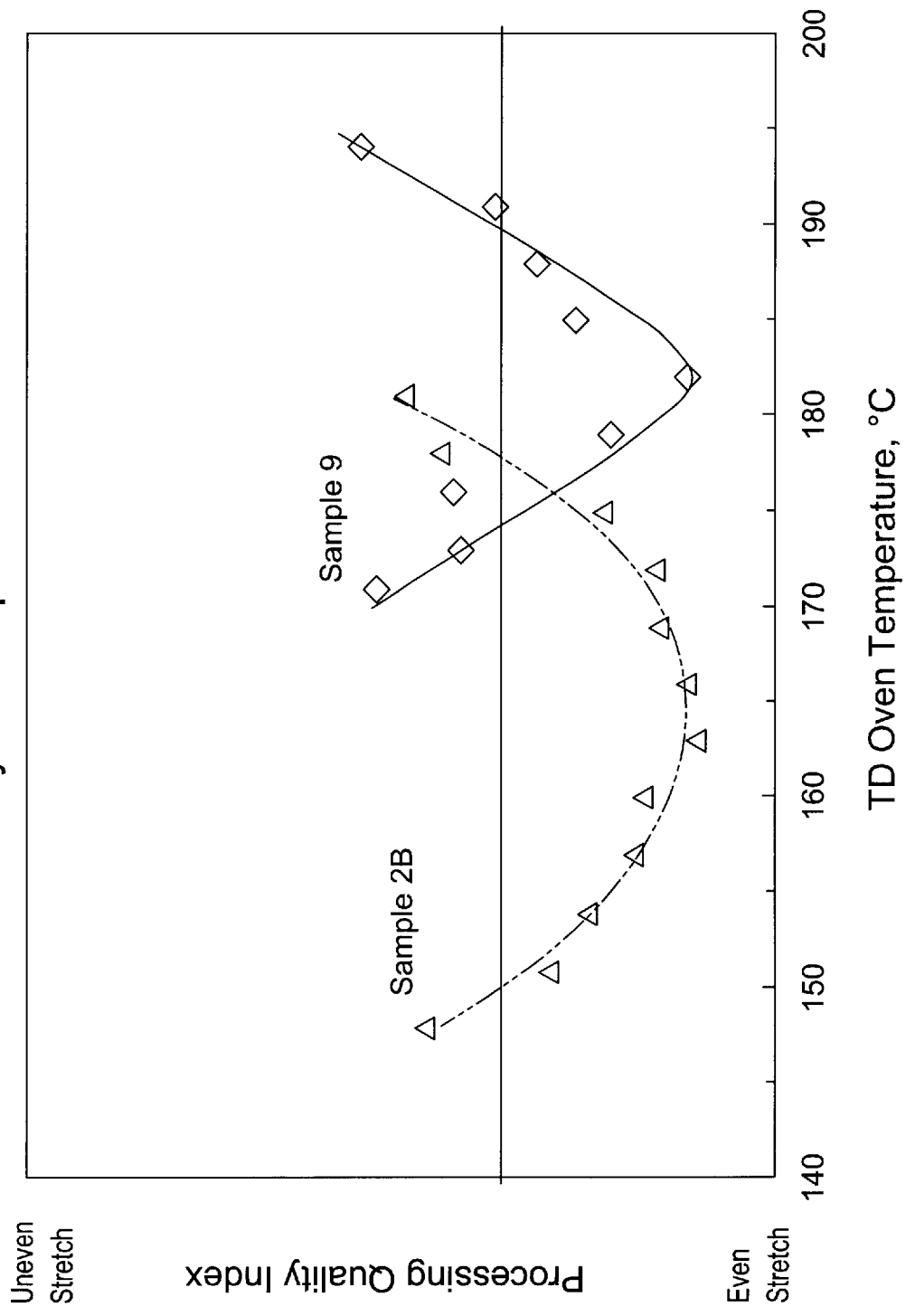
FIG. 5 is a Processability plot of Samples 2A and 9.

A desirable processability range is the range of TD oven temperatures over which good film quality and uniformity are maintained. This was done because in the tenter oriented polypropylene (OPP) film process, TD stretching is usually the most critical step when stretch ratio, rate and contour are constant. At low TD oven temperature, the film is too strong to be stretched evenly and it breaks. At high TD oven temperature, the film is too soft and weak to withstand stretching; it tends to sag leading to poorly formed film or breakage. So there is a desirable temperature range (processability range) to achieve uniform and good quality film. A preferred resin provides a greater processability range. The data for Samples 9 and 2B are shown in FIG. 5. The processability range for the invention polymer, Sample 2B, is substantially broader than for the ZN control, Sample 9. For example, at a processing quality index that provides a processability range of 15° C. (174–189° C.) for Sample 9, the corresponding processability range for Sample 2B is 28° C. (150–178° C.). The invention polymer provides no only greater processing latitude, but also the capability to operate at significantly lower TD oven temperatures. This indicates advantages of lower energy input and higher line speed potential.

This superior stretching performance over a wide range of strain rates and temperature is a key attribute of the invention polymers. It translates to a broader biaxially oriented film processability range versus today's best ZN propylene polymers and versus single metallocene-catalyzed propylene polymers. This processing advantage is accompanied by a good profile of film properties.

Samples 10–18.

Samples 10 through 18, data for which is represented in Tables 7A-12, is discussed below and exemplify the case of having a dual metallocene used to form a crystalline propylene polymer that is an RCP.

Samples 10 and 11 are propylene polymers from the dual metallocene combination, consistent with this invention. These are compared against several metallocene-based and conventional ZN based polypropylene polymers as follows. Samples 12 and 13 were prepared from single metallocene catalyst (MCN), the former being a homopolymer and the latter a copolymer, with ethylene the comonomer. Samples 14 and 15 were also prepared from a single metallocene catalyst, again the former being a homopolymer and the later an ethylene copolymer. ACHIEVE 3854 (ExxonMobil Chemical Company, Houston Tex.) is a commercial example of Sample 14. Sample 16 is a homopolymer produced from the dual metallocene combination. Samples 17 and 18 are commercial ZN propylene polymers. Polypropylene 9012E1 (ExxonMobil Chemical Company, Houston Tex.) is a commercial example of Sample 17, while polypropylene 9302E1 (also from ExxonMobil Chemical Company) is a commercial example of Sample 18.

The invention examples, Samples 10 and 11, were prepared using a catalyst system comprising an equimolar mix of two metallocenes on a silica support. The catalyst system was prepared as follows. In an inert nitrogen atmosphere, 5.31 g of rac-dimethylsilanedyl-bis(2-methylindenyl) zirconium dichloride was combined with 6.85 g of rac-dimethylsilanedyl-bis(2-methyl-4-phenylindenyl)zirconium dichloride and 732.1 g of 30 wt % methylalumoxane solution in toluene (Albemarle Corporation, Baton Rouge, La.). 2222 g of toluene was added to dilute the solution. Separately, 798 g of MS 948 silica (25 μm average particle size; 1.6 mL/g pore volume; Davison Chemical division of W. R. Grace, Baltimore, Md.) previously dehydrated to 600° C. in a stream of flowing nitrogen was charged to the catalyst preparation vessel. A toluene solution of Kemamide™ AS 990 (8 g of AS 990 in 80 g toluene, C.K. Witco Corporation, Greenwich, Conn.) was added to the slurry before drying. A slight nitrogen purge was added to the bottom of the vessel to aid in removing volatiles. At the end of drying, 972.5 g of free flowing solid was obtained. Analysis showed a loading of 10.2 wt % Al, 0.20 wt % Zr and an Al/Zr molar ratio of 175.

Several batches of the catalyst system were combined to provide sufficient charge for the polymerization runs. The catalyst system was oil slurried (20 parts by weight catalyst to 80 parts by weight Drakeol™ mineral oil (Penreco, Dickinson Tex.) for ease of addition to the reactor.

Sample 10 was polymerized as follows. The polymerization was conducted in a pilot scale continuous stirred tank, bulk liquid phase polymerization process employing two reactors in series. The reactors were equipped with jackets for removing the heat of polymerization. The reactor temperatures were set at 64° C. in the first reactor and 59° C. in the second reactor. Catalyst was fed at an estimated rate of 4.89 g/hr. A 2 wt % solution of triethylaluminum (TEAL) in hexane was employed as a scavenger and added at a level of 15 mppm. Propylene was fed at a rate of about 89 kg/hr to the first reactor and about 27 kg/hr to the second reactor. Ethylene comonomer was added to both reactors at a feed rate as needed to result in an incorporation level of 0.9 wt %. Hydrogen was used for molecular weight control and added at a level of 525 mppm to the first reactor and 325 mppm to the second reactor. Residence times were about 2.6 hr in the first reactor and about 1.8 hr in the second reactor. The production rate was about 25 kg/hr. The polymer was discharged from the reactors as a granular product having an MFR of about 2.6 dg/min and ethylene level of about 0.9 wt % based on the total weight of the polymer.

The copolymer Sample 11 was prepared using the same catalyst system and polymerization procedure as described above for Sample 10. The primary difference was an increased ethylene comonomer feed level, resulting in a final incorporation of 1.6 wt % ethylene-derived units. The discharged granular product had an MFR (23° C.) of about 3.4 dg/min.

Sample 16, a homopolymer product, was prepared using the same catalyst and polymerization method as described above for Samples 10 and 11. The polymerization did not involve any ethylene comonomer. The discharged granular product had an MFR of about 4.4 dg/min.

Samples 12 and 13, homopolymer and ethylene copolymer respectively, were polymerized using the single metallocene rac-dimethylsilanedyl-bis(2-methyl-4-phenylindenyl)zirconium dimethyl. The catalyst systems were prepared using generally similar procedures to that described above for Samples 10 and 11. Specifically, the catalyst for homopolymer Sample 12 involved the use of Davison silica D-952 (25 μm average particle size) as support, tris(perfluorophenyl)boron as cocatalyst, N,N-diethylaniline as the Lewis base, and phenyldimethylvinylsilane as a promoter, as disclosed in U.S. Pat. No. 6,143,686.

The catalyst was prepared in 0.5 kg batches in a nitrogen purged dry glove box per the following scheme. Tris (perfluorophenyl)boron in toluene is added to previously dehydrated silica and mixed well with N,N-diethylaniline added via syringe. Stirring continued while triethylaluminum (TEAL) was added. Metallocene rac-dimethylsilanediyl-bis(2-methyl-4-phenylindenyl) zirconium dichloride plus the promoter, phenyldimethylvinylsilane, were added and the reaction mixture held with continuous stirring for an additional hour. The solvent was removed and catalyst dried via nitrogen purging at 50° C.

The reaction sequence shown above is critical to obtaining good activity from the resulting catalyst. Characterization of the catalyst gave the following composition. 0.026 mmole Zr/g $SiO_2$; 0.11 mmole B/g $SiO_2$; 0.11 mmole phenyldimethylvinylsilane promoter/g $SiO_2$, and 0.57 mmole TEAL/g $SiO_2$.

Homopolymer Sample 12 was polymerized as follows. The polymerization was conducted in a pilot scale, continuous, stirred tank, bulk liquid phase polymerization process employing two reactors in series. The reactors were equipped with jackets for removing the heat of polymerization. The reactor temperatures were 70° C. in the first reactor and 64° C. in the second reactor. Catalyst was fed at a rate of about 1.3 g/br. TEAL (2.0 wt % in hexane solvent) was used as a scavenger and added at a level of 13 mppm. The catalyst system was fed as a 20 wt % slurry in mineral oil and was flushed into the first reactor with propylene. Total propylene feed to the first reactor was about 80 kg/hr. Propylene monomer feed to the second reactor was 30 kg/hr. Hydrogen was added for molecular weight control at a rate of 950 mppm to the first reactor and 1450 mppm to the second reactor. Reactor residence time were 2.6 hr in the first reactor and 1.8 hr in the second reactor. Overall polymer production was about 30 kg/hr. About 69% of the final polymer product was obtained from the first reactor and about 31% from the second reactor. Polymer was discharged as a granular product of about 1100 μm average particle size. The MFR (at 230° C.) was about 3.3 dg/min.

Ethylene copolymer Sample 13 was polymerized on the same pilot line equipment used for Sample 12 above. The reactor temperatures were 64° C. in the first reactor and 59° C. in the second reactor. Catalyst was fed at a rate of about 0.9 g/hr. TEAL (2.0 wt % in hexane solvent) was used as a scavenger and added at a level of 15 mppm. Total propylene feed to the first reactor was about 80 kg/hr. Propylene monomer feed to the second reactor was about 30 kg/hr. Hydrogen was added at a rate of about 580 mppm to the first reactor and about 1075 mppm to the second reactor. Ethylene comonomer feed rates were about 1.4 kg/hr to the first reactor and about 0.4 kg/hr to the second reactor. The ethylene incorporation level in the polymer was determined as 1.26 wt % in the first reactor and 1.16 wt % in the second reactor. Overall, polymer production was about 25 kg/hr. About 75% of the final polymer product was obtained from the first reactor and about 25% from the second reactor.

Reactor residence times were 2.6 hr in the first reactor and 1.8 hr in the second reactor. Polymer was discharged as a granular product of about 4.3 MFR (at 230° C.). The average particle size was about 1400 µm.

Copolymer Sample 15 was polymerized using the single metallocene dimethylsilanediyl-bis(2-methyl-indenyl) zirconium dichloride. The catalyst was prepared as follows. In an inert nitrogen atmosphere, 25.3 g of rac-dimethylsilanedylbis(2-methyl-indenyl)zirconium dichloride from Albemarle was combined with 2.24 kg of 30 wt % methylalumoxane in toluene solution also from Albemarle. After 1 hour mixing to dissolve the metallocene, the solution was transferred to a conical Hosokawa dryer. The lines were flushed with 5.5 kg of toluene. Then, with the Hosakawa agitator screw rotating at 60 rpm and the arm at 1.5 rpm, 2.4 kg of MS 952 silica from Grace Davison, previously dehydrated at 600° C., was added. 1.1 kg of toluene was used to rinse the feed port and upper section of the conical dryer. After 30 minutes agitation, the dryer jacket was heated to 49° C. and vacuum started while a slow stream of nitrogen entered from the bottom of the dryer. When the mixture entered the mud stage, the dryer jacket temperature was increased to 79° C. Drying continued until a free flowing catalyst solid was obtained.

The polymerization of copolymer Sample 15 was conducted on the same pilot scale, two-reactors-in-series line, referenced above. The reactor temperatures were 64° C. in the first reactor and 59° C. in the second reactor. Catalyst was fed at a rate of 4.8 g/hr. TEAL (2 wt % in hexane solvent) was used as a scavenger and added at a level of about 16 mppm. Total propylene feed to the first reactor was about 80 kg/hr. Propylene monomer feed to the second reactor was about 36 kg/hr. Ethylene comonomer flow to the first reactor was 0.38 kg/hr (0.40% concentration in the gas phase) and 0.22 kg/hr to the second reactor (0.45% concentration in the gas phase). Hydrogen was added for molecular weight control at a level of 527 mppm at the first reactor and 729 mppm at the second reactor. Overall, polymer production was 46.8 kg/hr. About 60% of the final product was obtained from the first reactor, and about 40% from the second reactor. Reactor residence times were 2.5 hr in the first reactor and 1.7 hr in the second reactor. Polymer was discharged as a granular product of about 650 µm average particle size. The WFR (230° C.) was about 25 and ethylene incorporation was measured as about 0.8 wt %.

Comparison of polypropylene resins from Samples 10–18 are listed in Table 7A and 7B. Using individual single metallocenes, the single-site metallocene catalyzed propylene homopolymers (Samples 12 and 14) and ethylene-propylene copolymers (Samples 13 and 15) are characterized by their narrow MWD, narrow CD, and low solvent extractables. It is of note that the two metallocene systems differ in the extent of hydrogen and ethylene comonomer responses, and therefor under the same polymerization conditions, produce polymers with different levels of molecular weight and comonomer content. When combining these two metallocene catalysts in the process of propylene homopolymerization, homopolymers (Sample 16) with broad MWD as a result of different MW capability from constituent catalysts are produced. It is noted from the data in Tables 7A and 7B that the MWD and polydispersity indices are only marginally higher than those from the individual components.

What is unexpected in one embodiment of the invention, as demonstrated in this invention in Samples 1, 2A, 2B, 10 and 11 is the significant MWD broadening by copolymerizing ethylene comonomer with the mixed metallocenes (each metallocene used is chemically distinct). This is indicated quantitatively by the larger Mz values for these invention Samples relative to the comparative examples as shown in the tables. The Mz value is the higher average molecular weight value, and its calculation is common, as discussed by A.R. Cooper in CONCISE ENCYCLOPEDIA OF POLYMER SCIENCE AND ENGINEERING 638–39 (J. I. Kroschwitz, ed., John Wiley & Sons 1990), which in the present invention is a measure of the degree of molecular weight broadening towards higher molecular weights. This is due to the combined MWs of the polymers generated by the two stages of the polymerization process, wherein one metallocene generates a polymer of higher MW, and/or broader MW. In particular, the 4-phenyl-1-indenyl substituted metallocenes increase the MWs and creates the high Mz values. Values for Mn, Mw and Mz are in Tables 1B and 7B for Samples 1–18.

The substantial molecular weight broadening toward the higher molecular weight end of the distribution for the invention polymers can be seen in the measurement of recoverable compliance, the value for which is well known to track the high molecular weight end species of the distribution. The data (FIGS. 1 and 2) show the values for recoverable compliance to increase from $1.1 \times 10^4$ Pa$^{-1}$ for Sample 4 (single metallocene, homopolymer) to $3.6 \times 10^4$ Pa$^{-1}$ for Sample 3 (two metallocenes, homopolymer) to greater than or equal to $3.9 \times 10^4$ Pa$^{-1}$ for invention polymers Samples 1, 2A and 2B (two metallocenes, TCRs). The recoverable compliance in Samples 10 and 11 are, respectively, 3.6 and $4.3 \times 10^4$ Pa$^{-1}$.

Figure 6:
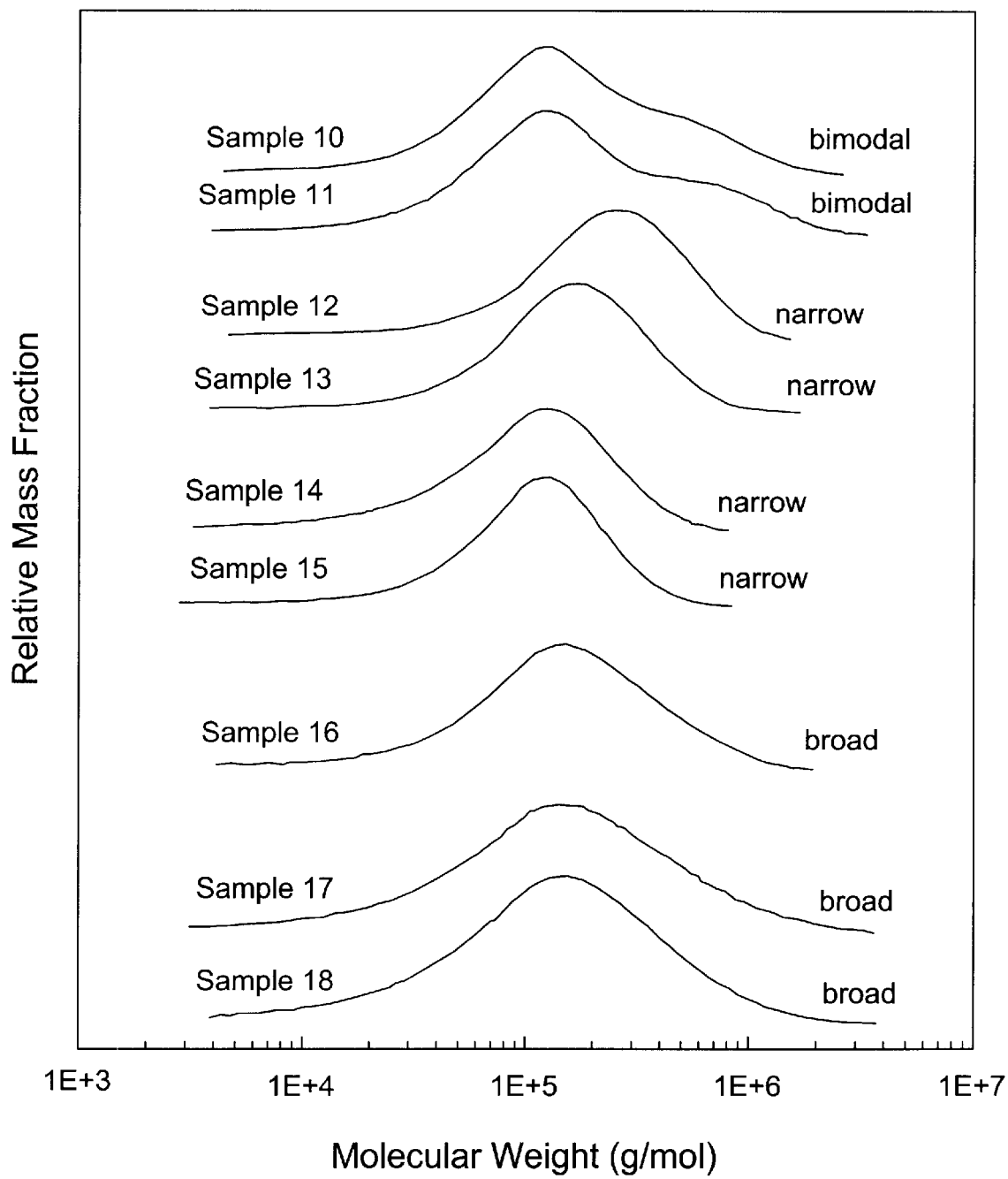
FIG. 6 is a GPC Molecular Weight Distribution plot of Samples 10–18.
Figure 7:
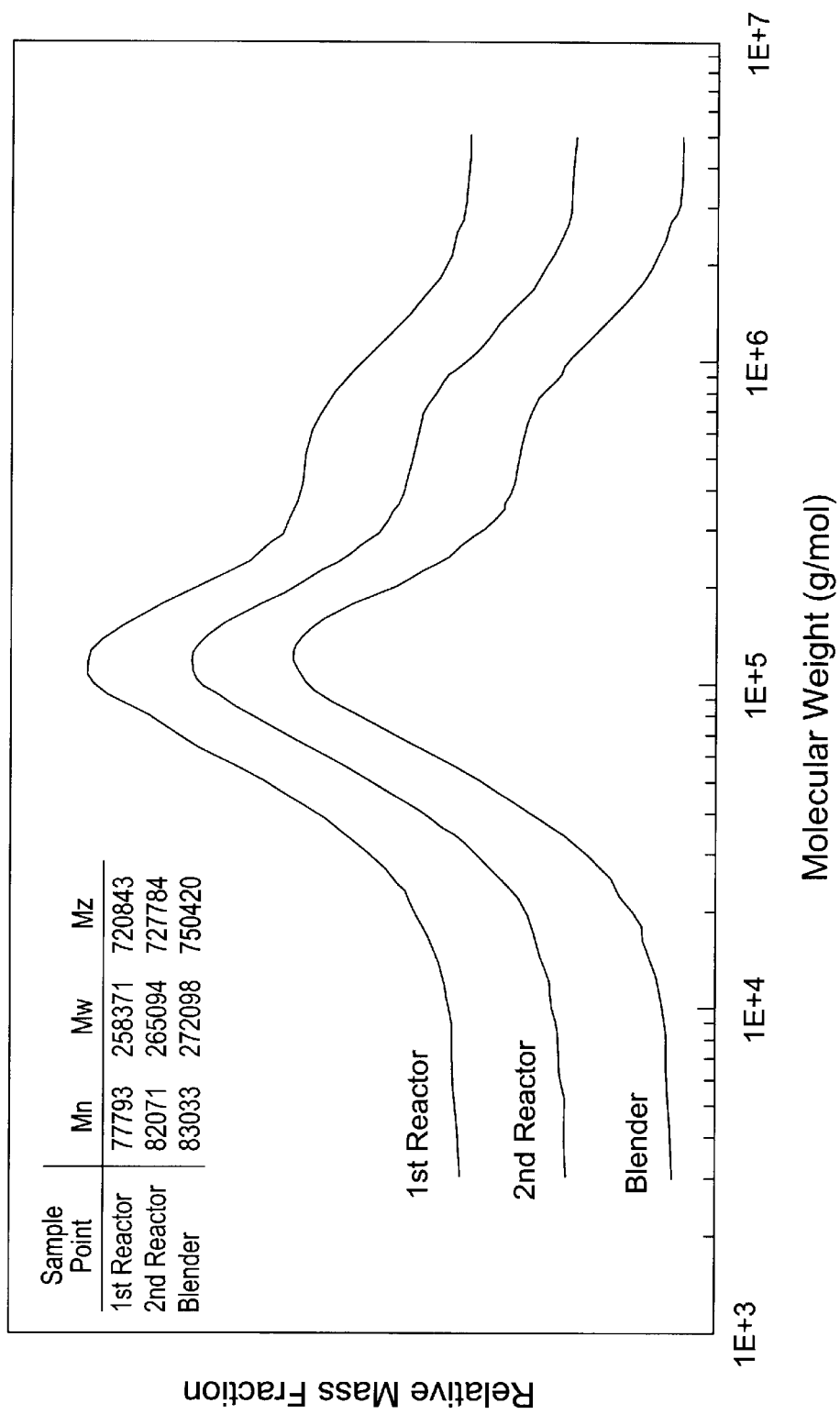
FIG. 7 is a GPC Molecular Weight Distribution of Sample 10 Reactor Discharged Polymers.

GPC comparison of the MWD of the invention polymers versus other polymers is shown in FIG. 6 for the RPC embodiment. Although a two-reactor process was employed in the production of Samples 10 and 11, an indication of broad and bimodal MWD polymer was already produced in the first reactor. FIG. 7 shows the MWD of polymers discharged at various stages of polymerization, and reflects the high Mz values of the polymers of the present invention.

Figure 8:
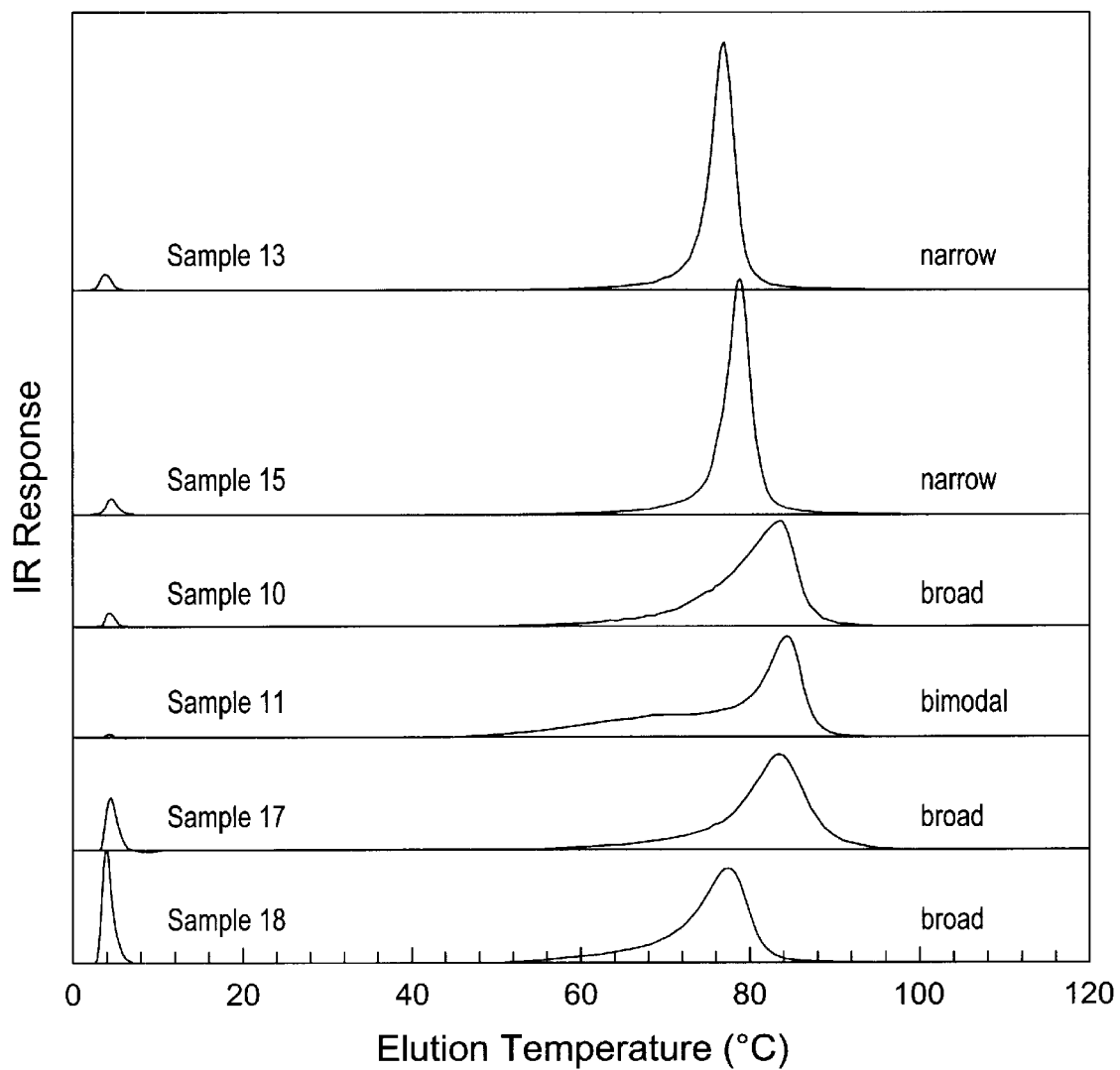
FIG. 8 is a Composition Distribution for Samples 10, 11, 13, 15, 17 and 18.

The invention RCPs (Samples 10 and 11) also display a relatively broad CD as opposed to the inherent narrow CD of single-site metallocene catalyzed copolymers (Samples 13 and 15), as exemplified in FIG. 8. Although the same level of CD broadening may be achieved with conventional ZN catalysts, the valued attributes of both broad CD and low extractables from the invention polymers affords advantages in many applications which require good cleanliness, less volatile fume, less thermal oxidation breakdown, improved recyclability, and other attributes.

Further CD analysis of the invention RCP Sample 10 was conducted by a preparative temperature rising elution fractionation (TREF) technique in the temperature range of room temperature to 100° C. The fractions obtained from different ranges of elution temperature were selected for $^{13}$C-NMR and GPC characterizations. The 13C-NMR results shown in Table 8 suggest that the fractionation takes place according to the defect structures (stereo or regio types of defect) and the level of comonomer incorporation. It is apparent that fraction-3 polymer, which elutes at the highest temperature range, has minimum chain disruptions and the lowest level of comonomer incorporation relative to the other two fractions.

Figure 9:
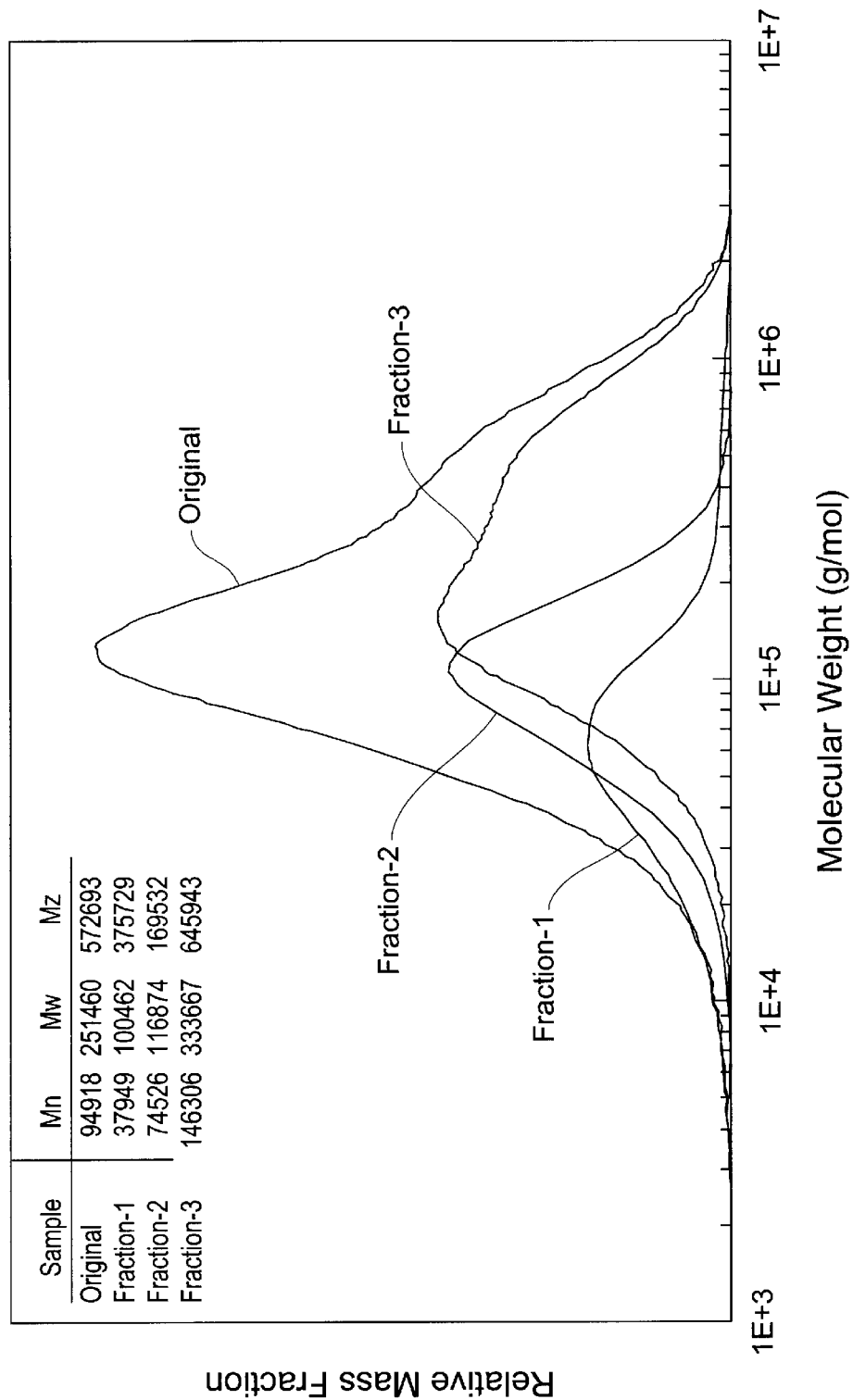
FIG. 9 is a Molecular Weight Distribution of Sample 10 and its Fractions.

The details of MW and MWD of each fraction are shown in FIG. 9. The fraction-3 polymer has both MW and MWD higher than those of fraction-1 and -2. The above results show that the invention polymer has a polymer comprising: (1) a high MW and broad MWD component with a relatively lower level of comonomer incorporation; (2) a moderate MW and narrow MWD component with a moderate level of comonomer incorporation, and (3) a low MW and broad MWD component with a high level of comonomer incorporation.

For many product applications that require the synergistic benefits of processability and property balance, the invention method provides the advantage of in-situ production of polymers to meet these demands. For example, in molded parts and film products the stiffness and dart-puncture resistance balance are always desirable, and the invention preparation offers reactor made polymers to achieve these end properties.

One of the advantages of this invention is that, despite the substantial level of MWD and CD broadening, the hexane extractables for the invention polymers are still below 0.3 wt %, which is substantially lower than for ZN polymers. In one embodiment, the hexane extractables is less than 3 wt %, in another embodiment less than 2 wt %, and in yet another embodiment the hexane extractable is less than 1 wt %.

Figure 10:
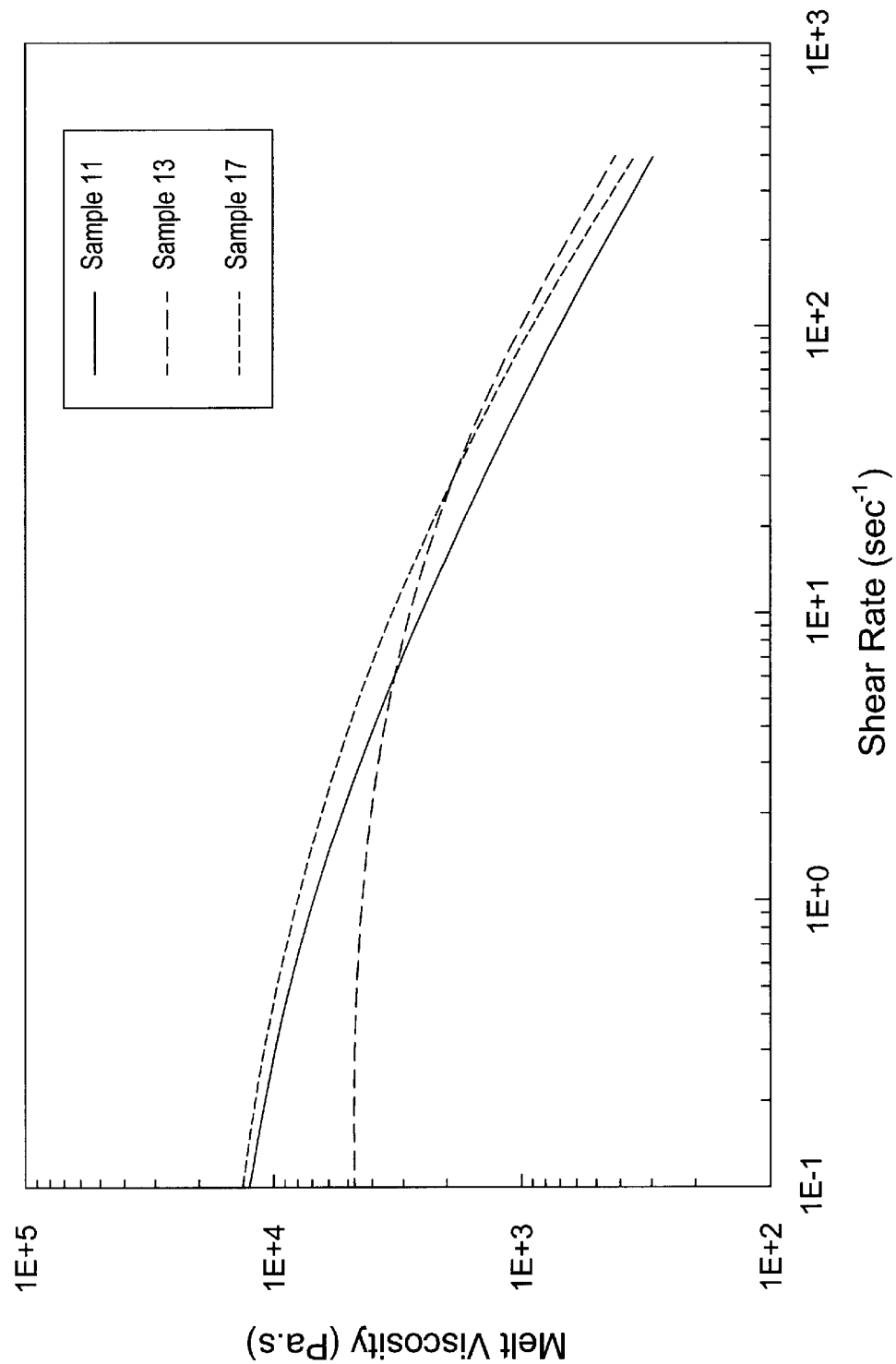
FIG. 10 is a plot of Shear Viscosity versus Shear Rate of Samples 11, 13 and 17.

The MWD broadening from the invention polymer benefits the Theological properties in terms of higher melt strength at low shear rate and improved shear thinning at high shear rate, as exemplified in FIG. 10. In many fabrication processes, such as thermoforming, casting, blowing, spinning, stretching, etc., high melt strength is desirable to mitigate any potential instability or sagging of fabricated parts at the molten stage. The greater shear thinning at increased shear rate helps to reduce extruder torque in the extrusion and improve mold flow and cycle times in the molding process.

Cast films were prepared from Samples 10, 11, 13 and 17 using the following operations. Cast monolayer films were fabricated on a Killion cast film line. This line has three 24:1 L/D extruders ("A" extruder at 2.54 cm diameter; "B" extruder at 1.91 cm diameter; and "C" extruder at 1.91 cm diameter), which feed polymer into a feedblock. For monolayer cast film production, polymer was fed only into "A" extruder. The feedblock diverts molten polymer from the extruder to a 20.32 cm wide Cloeren die. Molten polymer exits the die and is cast on a chill roll (20.3 cm diameter, 25.4 cm roll face). The casting unit is equipped with adjustable winding speeds to obtain film of the targeted thickness. Operating conditions are in Table 9.

Cast film properties, at film thickness of 102 μm (4 mil) and 38 μm (1.5 mil), are reported in Tables 10A and 10B, respectively. Data show that cast films from the invention polymers have an attractive balance of stiffness (1% secant modulus) and toughness (puncture and dart impact resistance). Specifically, the film stiffness from the invention polymer (Samples 10 and 11) is higher than that of the narrow MWD metallocene propylene copolymer (Sample 13) and the broad MWD ZN copolymer (Sample 17). With additional ethylene comonomer in Sample 11 than in Sample 10, the dart impact strength of Sample 11 is greatly improved and exceeds that of the controls (Samples 13 and 17). Other important film properties of the invention polymer include opticals (haze and gloss), moisture barrier (WVTR) and heat sealing strength, which are all comparable or improvements over the prior art films. The low tear strength, when combined with the good toughness, of the invention polymers could be desirable in specialty applications where "easy tear" is a beneficial attribute.

Shrink films were prepared from Samples 11 (invention polymer) and 18 using the following operations. Cast monolayer sheet typically 508 μm (20 mil) thickness was fabricated on a Killion cast film line using procedures similar to that described above. For monolayer sheet production, the same polymer was fed into all three extruders. The feedblock diverts molten polymer from each extruder to specific channels. From the channels, the combined streams of molten polymer enter to the casting die. Molten polymer exits the die and is cast on the chill roll to form a thick sheet. Operating conditions used for preparing cast sheets are shown in Table 11.

Following the production of cast sheets, 5.08 cm×5.08 cm squares of the sheets were stretched (to 6×6 along MD×TD) using a T.M. Long stretching machine. To produce clear, good quality films, the stretching temperatures of 141° C. and 138° C. were selected for Samples 11 and 18, respectively. Data of film properties are shown in Table 12. Shrink film from the invention polymer displays a favorable balance of properties, including WVTR, stiffness (1% secant modulus), tensile strength, and shrink tension. Shrink tension relates to the force that the final shrink packaging applies on the package contents at a given packaging temperature. Generally, a high shrink tension force (but below the force level where damage or deformation is inflicted on the package contents) is highly desirable to provide a taut, crisp packaging that secures the package contents as well as provides an appealing presentation.

Although the Examples in this invention deal primarily with films, it will be instantly recognized that the attributes of the invention polymers will lend themselves to use in other end-application areas as well. For example, in thermoforming and blow molding, the increased melt strength derived from the broadening of distribution to the high molecular weight end, coupled with the easier orientability at lower temperatures, should result in performance benefits versus single metallocene-catalyzed propylene polymers.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1A

Description of samples 1–9

| Sample | Catalyst | MFR | Comonomer (wt %) | Melting Temp. (° C.) | Hexane Extractables (wt %) | TREF Extractables (wt %) |
|---|---|---|---|---|---|---|
| 1 | 2 MCN | 2.1 | C$_2$ (0.8) | 147.1 | 1.0 | 3.8 |
| 2A | 2 MCN | 1.0 | C$_2$ (1.0) | 146.5 | 0.9 | 3.9 |
| 2B | 2 MCN | 1.7 | C$_2$ (0.8) | 146.7 | — | 2.5 |
| 3 | 2 MCN | 2.0 | none | 151.0 | 0.7 | — |
| 4 | 1 MCN | 4.3 | none | 151.0 | 0.3 | — |
| 5 | 1 MCN | 3.9 | C$_2$ (1.1) | 139.0 | 0.4 | — |
| 6 | ZN | 2.6 | C$_2$ (0.55) | 157.1 | 3.2 | 7.6 |
| 7 | ZN | 3.4 | C$_2$ (0.4) | 156.3 | 3.1 | 5.9 |
| 8 | ZN | 2.0 | C$_2$ (2.8) | 146.0 | 3.5 | — |
| 9 | ZN | 2.1 | C$_2$ (0.6) | 158.5 | — | — |

TABLE 1B

Description of samples 1–9

| Sample | Mn (× 1000) | Mw (× 1000) | Mz (× 1000) |
|---|---|---|---|
| 1 | 114 | 352 | 822 |
| 2A | 106 | 386 | 869 |
| 2B | 113 | 322 | 764 |

TABLE 1B-continued

Description of samples 1–9

| Sample | Mn (× 1000) | Mw (× 1000) | Mz (× 1000) |
|---|---|---|---|
| 3 | 115 | 305 | 668 |
| 4 | 127 | 236 | 366 |
| 5 | 123 | 221 | 343 |
| 6 | 63 | 250 | 691 |
| 7 | 60 | 250 | 622 |
| 8 | 58 | 274 | 819 |
| 9 | 58 | 248 | 627 |

TABLE 2

Biaxially oriented film processability[1]

| Stretching Temperature (° C.) | Sample 4 (Tm = 151° C.) | Sample 3 (Tm = 151° C.) | Sample 1 (Tm = 147.1° C.) | Sample 2A (Tm = 146.5° C.) | Sample 2B (Tm = 146.7° C.) | Sample 6 (Tm = 157.1° C.) | Sample 7 (Tm = 156.3° C.) |
|---|---|---|---|---|---|---|---|
| 140.6 | | | | B | U | | |
| 143.3 | B | U | B | E | U | | |
| 146.1 | | | B | E | E | | |
| 148.9 | U | E | U | E | E | B | B |
| 151.7 | | | E | E | E | B | U |
| 154.4 | E | E | E | E | E | U | E |
| 157.2 | | | E | E | S | E | E |
| 160.0 | S | S | S | E | | E | E |
| 166.0 | | | | S | | S | |

[1]E = Even stretch, U = Uneven stretch (i.e., unstretched marks/unstretched regions), B = Break, S = Sagging

TABLE 3

Biaxially oriented film properties

| Film Property | Sample 4 | Sample 3 | Sample 1 | Sample 2A | Sample 2A[1] | Sample 2B[2] | Sample 6 |
|---|---|---|---|---|---|---|---|
| Thickness, μm | 18 | 18 | 18 | 15 | 18 | 15 | 15 |
| Haze % | 1.0 | 0.9 | 0.9 | 1.0 | 0.3 | 0.3 | 0.3 |
| Gloss % | 92 | 94 | 92 | 91 | 94 | 94 | 94 |
| WVTR @ 37.8° C. & 100% RH, g/m²/day per 25.4 μm | 5.7 | 5.9 | 6.5 | 7.1 | 6.7 | 6.9 | 6.5 |
| 1% Sec. Modulus, MPa (kpsi) | 2130 (309) | 2247 (326) | 2185 (317) | 2289 (332) | 2359 (342) | 2346 (340) | 2729 (396) |
| Ultimate Tensile Strength, MPa (kpsi) | 179 (26) | 193 (28) | 186 (27) | 200 (29) | 200 (29) | 209 (30) | 207 (30) |
| Ultimate Elongation, % | 61 | 70 | 62 | 65 | 65 | 75 | 71 |

[1]Stretching temperature 143.3° C.; by comparison, Sample 2A data in column 5 is on film prepared at 154.4° C.
[2]Stretching temperature 146° C. for Sample 2B. Stretching temperature for the remaining Samples was 154° C.

TABLE 4 biaxially oriented film properties comparison

| Film Property | Sample 2A | Sample 8 |
|---|---|---|
| Thickness, μm | 18 | 18 |
| Haze, % | 0.3 | 0.2 |
| Gloss, % | 94 | 95 |
| WVTR @ 37.8° C. & 100% RH, g/m²/day per 25.4 μm | 6.7 | 8.3 |
| 1% Sec. Modulus, MPa (kpsi) | 2359 (342) | 1851 (268) |
| Ultimate Tensile Strength, MPa (kpsi) | 200 (29) | 170 (25) |
| Ultimate Elongation, % | 65 | 72 |

TABLE 5

Instron TD tensile strength (MPa) per case 1 stretching conditions[1]

| TD Stretching Temperature (° C.) | Sample 4 (Tm = 151° C.) | Sample 3 (Tm = 151° C.) | Sample 1 (Tm = 147.1° C.) | Sample 2A (Tm = 146.5° C.) | Sample 6 (Tm = 157.1° C.) | Sample 7 (Tm = 156.3° C.) |
|---|---|---|---|---|---|---|
| 100 | | | B | B(1,025%) | | |
| 110 | | B(970%) | 9.8 | | | |
| 120 | | | 8.2 | 7.5 | | |
| 130 | B | B | 6.6 | 7.4 | B | B |
| 135 | B | B | 6.3 | 6.4 | B | B(935%) |
| 140 | B | B(1,050%) | 4.5 | 5.3 | B | 6.0 |
| 145 | B | 6.3 | 3.2 | — | B(965%) | 5.0 |
| 150 | B(900%) | 5.1 | 3.1 | 3.7 | 5.1 | 4.8 |

[1]Sequential Stretching on Instron
MD: 700%, 50.8 mm/min, 110° C., 25.4 mm jaw separation
TD: 1,100%, 508.0 mm/min, varying temperatures, 25.4 mm jaw separation, strain rate 2200%/min
B = Break prior to full 1,100% extension

TABLE 6

Instron TD tensile strength (MPa) per case 2 stretching conditions[1]

| TD Stretching Temp. (° C.) | Sample 1 ($T_m$ = 147.1° C.) | Sample 2A ($T_m$ = 146.5° C.) | Sample 6 ($T_m$ = 157.1° C.) | Sample 7 ($T_m$ = 156.3° C.) |
|---|---|---|---|---|
| 120 | B(1,365%) | B(2,100%) | B | B |
| 130 | 8.5 | 8.9 | B | B |
| 140 | 5.1 | 6.1 | B | B |
| 150 | 3.4 | 3.0 | B(1,965%) | B(1,765%) |
| 160 | — | — | 2.9 | 1.8 |

[1]Sequential Stretching on Instron
MD: 700%, 50.8 mm/min., 110° C., 25.4 mm jaw separation
TD: 2,200%, 1,270 mm/min., varying temperatures, 12.7 mm jaw separation, strain rate 11,000%/min
B = Break prior to full 2,200% extension

TABLE 7A

Description of samples 10–18

| Sample | Catalyst | MFR dg/min | Comonomer (wt %) | MWD Characteristics | CD Characteristics | Polydispersity Index | Melting Temp. (° C.) | Crystallization Temp. (° C.) | Hexane Extractables (wt %) |
|---|---|---|---|---|---|---|---|---|---|
| 10 (invention) | 2 MCN | 2.6 | $C_2$ (0.9) | Bimodal | Broad | 5.4 | 144 | 105 | 0.3 |
| 11 (invention) | 2 MCN | 3.4 | $C_2$ (1.6) | Bimodal | Bimodal | 5.7 | 142 | 102 | 0.2 |
| 12 (control) | MCN | 3.3 | None | Narrow | — | 2.0 | 151 | 107 | 0.3 |
| 13 (control) | MCN | 4.3 | $C_2$ (1.1) | Narrow | Narrow | 1.9 | 140 | 102 | 0.3 |
| 14 (control) | MCN | 24 | None | Narrow | — | 2.0 | 149 | 108 | 0.5 |
| 15 (control) | MCN | 25 | $C_2$ (0.8) | Narrow | Narrow | 2.1 | 143 | 104 | 0.3 |
| 16 (control) | 2 MCN | 4.4 | None | Broad | — | 2.6 | 151 | 110 | 0.7 |
| 17 (control) | ZN | 2.9 | $C_2$ (2.7) | Broad | Broad | 3.6 | 146 | 101 | 1.6 |
| 18 (control) | ZN | 3.6 | $C_2$ (4.0) | Broad | Broad | 2.9 | 138 | 95 | 3.0 |

TABLE 7B

Description of samples 10–18

| Sample | MWD (Mw/Mn) | Mn (× 1000) | Mw (× 1000) | Mz (× 1000) |
|---|---|---|---|---|
| 10 | 2.8 | 109 | 305 | 754 |
| 11 | 2.9 | 100 | 291 | 734 |
| 12 | 2.1 | 140 | 287 | 440 |
| 13 | 2.1 | 96 | 203 | 337 |
| 14 | 1.9 | 81 | 152 | 228 |
| 15 | 1.8 | 75 | 134 | 199 |
| 16 | 2.4 | 94 | 222 | 426 |
| 17 | 4.7 | 58 | 274 | 819 |
| 18 | 3.3 | 70 | 232 | 548 |

TABLE 8

Punctuation comparison of sample 10 and its fractions (per 10,000 propylene units)

| Sample | Elution Temperature (° C.) | Elution Fraction (wt %) | Isotactic Index | 2,1 Inversion Punctuations | Stereo Punctuations | Ethylene Punctuations | Total Punctuations | Wt % Ethylene |
|---|---|---|---|---|---|---|---|---|
| Original | — | 100 | 97.1 | 55 | 83 | 160 | 298 | 1.1 |
| Fraction 1 | <68 | 10.3 | 93.7 | 41 | 112 | 220 | 373 | 1.5 |
| Fraction 2 | 68–73 | 25.3 | 95.3 | 35 | 90 | 210 | 335 | 2.7 |
| Fraction 3 | >73 | 64.4 | 98.1 | 56 | 42 | 110 | 208 | 0.8 |

TABLE 9

Extrusion conditions during casting of a monolayer film from samples 10–19

| Variable | "A" Extruder |
|---|---|
| Zone 1 Temperature (° C.) | 204 |
| Zone 2 Temperature (° C.) | 216 |
| Zone 3 Temperature (° C.) | 222 |
| Adapter 1 Temperature (° C.) | 232 |
| Adapter 2 Temperature (° C.) | 238 |
| Die/Feedblock (° C.) | 260 |
| Screw Speed (rpm) | 120 |
| Chill Roll Temperature (° C.) | 23 |
| Line Speed (m/min) | 2.4/5.8 |
| Gauge ($\mu$m) | 102/25 |

TABLE 10A

Film properties of random copolymer cast films

| Property | Sample 10 | Sample 11 | Sample 13 | Sample 17 | Test Method |
|---|---|---|---|---|---|
| Thickness ($\mu$m) | 102 | 102 | 102 | 102 | Profilometer |
| Haze (%) | 6.3 | 4.8 | 5.3 | 12.2 | ASTM D 1003 |
| Gloss @ 45° | 76 | 75 | 80 | 73 | ASTM D 2457 |
| WVTR @ 37.8° C., 100% RH (g/m$^2$/day per 25 $\mu$m) | 14.4 | 15 | 14.8 | 17 | ASTM F 372 |
| 1% Sec. Modulus (MPa) | | | | | ASTM D 882 |
| MD | 794 | 723 | 658 | 569 | |
| TD | 796 | 717 | 704 | 561 | |
| Yield Tensile Strength (MPa) | | | | | ASTM D 882 |
| MD | 21 | 20 | 19 | 16 | |
| TD | 21 | 21 | 19 | 16 | |
| Yield Elongation (%) | | | | | ASTM D 882 |
| MD | 4.5 | 4.6 | 4.7 | 4.6 | |
| TD | 4.6 | 4.5 | 4.6 | 4.6 | |
| Ultimate Tensile Strength (MPa) | | | | | ASTM D 882 |
| MD | 64 | 55 | 52 | 58 | |
| TD | 54 | 46 | 46 | 48 | |
| Ultimate Elongation (%) | | | | | ASTM D 882 |
| MD | 687 | 659 | 690 | 748 | |
| TD | 810 | 732 | 715 | 788 | |
| Puncture Resistance | | | | | ASTM D 3420 |
| Peak Force (kg/25.4 $\mu$m) | 2.7 | 2.6 | 2.5 | 1.9 | |
| Break Energy (J/25.4 $\mu$m) | 221 | 202 | 200 | 127 | |
| Impact Strength @ 23° C. (g/25.4 $\mu$m) | 29 | 155 | 30 | 86 | ASTM D 1709 |
| Elmendorf Tear Strength (g/25.4 $\mu$m) | | | | | ASTM D 1922 |
| MD | 37 | 38 | 45 | 200 | |
| TD | 180 | 146 | 87 | 1109 | |

TABLE 10B

Film propitious of random copolymer cast films

| Property | Sample 10 | Sample 11 | Sample 13 | Sample 17 | Test Method |
|---|---|---|---|---|---|
| Thickness (μm) | 38 | 38 | 38 | 38 | Profilometer |
| Haze (%) | 2.7 | 3.6 | 2.1 | 4.2 | ASTM D 1003 |
| Gloss @ 45° | 82 | 76 | 85 | 82 | ASTM D 2457 |
| WVTR @ 37.8° C., 100% RH (g/m²/day per 25 μm) | 14.8 | 16.1 | 15.4 | 19 | ASTM F 372 |
| 1% Sec. Modulus (MPa) | | | | | ASTM D 882 |
| MD | 712 | 649 | 655 | 521 | |
| TD | 812 | 721 | 702 | 534 | |
| Yield Tensile Strength (MPa) | | | | | ASTM D 882 |
| MD | 21 | 19 | 19 | 16 | |
| TD | 19 | 21 | 19 | 17 | |
| Yield Elongation (%) | | | | | ASTM D 882 |
| MD | 4.6 | 4.4 | 4.3 | 4.2 | |
| TD | 4.1 | 3.9 | 4.3 | 4.3 | |
| Ultimate Tensile Strength (MPa) | | | | | ASTM D 882 |
| MD | 96 | 78 | 66 | 86 | |
| TD | 52 | 44 | 49 | 50 | |
| Ultimate Elongation (%) | | | | | ASTM D 882 |
| MD | 526 | 524 | 558 | 538 | |
| TD | 734 | 706 | 688 | 749 | |
| Puncture Resistance | | | | | ASTM D 3420 |
| Peak Force (kg/25.4 μm) | 3.1 | 3.1 | 3 | 2.4 | |
| Break Energy (J/25.4 μm) | 234 | 228 | 236 | 161 | |
| Elmendorf Tear Strength (g/25.4 μm) | | | | | ASTM D 1922 |
| MD | 20 | 16 | 32 | 18 | |
| TD | 768 | 645 | 153 | 829 | |
| Heat Sealing Strength (N/15 mm) | | | | | Theller film sealer |
| 130° C. | 2 | 1 | 1 | 0.6 | |
| 140° C. | 17.3 | 9.3 | 14.6 | 4.4 | |
| 150° C. | 18 | 15.9 | 14.4 | 11 | |
| 160° C. | 13.4 | 13.3 | 13.4 | 12.8 | |

TABLE 11

Extrusion conditions during casting of monolayer sheet

| Variable | "A" Extruder | "B" Extruder | "C" Extruder |
|---|---|---|---|
| Zone 1 Temperature (° C.) | 204 | 204 | 204 |
| Zone 2 Temperature (° C.) | 216 | 216 | 216 |
| Zone 3 Temperature (° C.) | 232 | 232 | 232 |
| Adapter 1 Temperature (° C.) | 235 | 235 | 235 |
| Adapter 2 Temperature (° C.) | 235 | 235 | — |
| Die/Feedblock (° C.) | 246 | — | 246 |
| Screw Speed (rpm) | 121 | 94 | 145 |
| Chill Roll Temperature (° C.) | | 38 | |
| Line Speed (m/min) | | 1.5 | |
| Gauge (μm) | | 20 | |

TABLE 12

Film Properties of Random Copolymer Stretched Films

| Property | Sample 11 | Sample 18 | Test Method |
|---|---|---|---|
| Thickness (μm) | 15 | 16 | Profilometer |
| Haze (%) | 0.3 | 0.3 | ASTM D 1003 |
| Gloss @ 45° | 94 | 93 | ASTM D 2457 |
| WVTR @ 37.8° C., 100 RH (g/m²/day per 25.4 μm) | 7.3 | 10.5 | ASTM F 372 |
| 1% Sec. Modulus (MPa) | 2111 | 1284 | ASTM D 882 |
| Yield Tensile Strength (MPa) | 48 | 37 | ASTM D 882 |
| Yield Elongation (%) | 3.7 | 3.5 | ASTM D 882 |
| Ultimate Tensile Strength (MPa) | 200 | 181 | ASTM D 882 |
| Ultimate Elongation (%) | 76 | 72.5 | ASTM D 882 |
| Shrinkage @ 135° C., 3 min (%) | 40 | 42 | Instron Model 1122 |
| Shrink Tension @ 110° C. (g force) | 156 | 121 | Instron Model 1122 |

We claim:

1. A film comprising an isotactic propylene composition comprising a reactor blend comprising at least four copolymers, the composition comprising from 0.05 to 15 wt % comonomer units based on the total weight of the composition, the composition has a Mz value of from 400,000 to 2,000,000 and an MWD value of from 2.1 to 10.0.

2. The film of claim 1, wherein the composition has a Mn value from 90,000 to 120,000.

3. The film of claim 1, wherein the hexane extractables level of the composition is less than 2 wt % as measured by 21 CFR 177.1520(d)(3)(ii).

4. The film of claim 1, wherein the hexane extractables level of the composition is less than 3 wt % as measured by 21 CFR 177.1520(d)(3)(ii).

5. The film of claim 1, wherein the comonomer wt % is in the range of from 0.1 to 10.0.

6. The film of claim 1, wherein the comonomer wt % is in the range of from 0.5 to 5.0.

7. The film of claim 1, wherein the Mz value is from 500,000 to 1,500,000 molecular weight units.

8. The film of claim 1, wherein the Mz value is from 600,000 to 800,000 molecular weight units.

9. A film comprising an isotactic propylene composition comprising a reactor blend comprising at least four copolymers, the composition comprising from 0.05 to 15 wt % comonomer units based on the total weight of the composition, wherein the polymerization process used to form the composition is conducted in the presence of a catalyst system comprising at least two different metallocene catalysts, and wherein the molecular weight distribution of the composition is characterized as being bimodal, the composition has a Mz value of from 400,000 to 2,000,000.

10. The film of claim 9, wherein the metallocene catalysts are each independently represented by the formula:

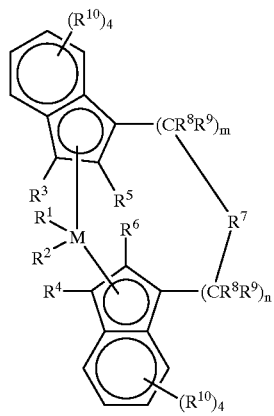

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which is optionally halogenated, a $C_6$–$C_{10}$ aryl group which is optionally halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

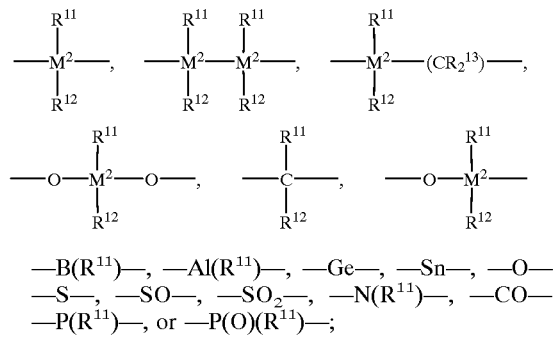

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, optionally to form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals optionally are joined together to form a ring system.

11. The film of claim 9, wherein the metallocene catalysts are selected from the group consisting of:

dimethylsilandiylbis(2-methylindenyl) zirconium dichloride, dimethylsilandiylbis (2-methyl-4-phenyl-1-indenyl) zirconium dichloride, dimethylsilandiylbis(2,4-dimethylindenyl) zirconium dichloride, dimethylsilandiylbis(2,5,6-trimethylindenyl) zirconium dichloride, dimethylsilandiylbis indenyl zirconium dichloride, dimethylsilandiylbis(4,5,6,7-tetrahydroindenyl) zirconium dichloride, dimethylsilandiylbis(2-methyl-4,5-benzoindenyl) zirconium dichloride, dimethylsilandiylbis (2-methyl-4-phenyl-1-indenyl) zirconium dimethyl, dimethylsilandiylbis(2-methyl-4,5-benzoindenyl) zirconium dimethyl, dimethylsilandiylbis(2-methyl-4,6-diisopropylindenyl) zirconium dimethyl, dimethylsilandiylbis(2ethyl-4-phenyl-1-indenyl) zirconium dimethyl, dimethylsilandiylbis (2-ethyl-4-naphthyl-1-indenyl) zirconium dimethyl, phenyl(methyl)silandiylbis(2-methyl-4-phenyl-1-indenyl) zirconium dimethyl, dimethylsilandiylbis(2-methyl-4-(1-naphthyl)-1-indenyl) zirconium dimethyl, dimethylsilandiylbis(2methyl-4-(2-naphthyl)-1-indenyl) zirconium dimethyl, and dimethylsilandiylbis(2-methyl-1-indenyl) zirconium dimethyl, and mixtures thereof.

12. The film of claim 9, wherein the hexane extractables is less than 3 wt % as measured by 21 CFR 177.1520(d)(3) (ii).

13. The film of claim 9, wherein the comonomer wt % is in the range of from 0.1 to 10.0.

14. The film of claim 9, wherein the Mz value of the composition is from 500,000 to 1,500,000 molecular weight units.

15. The film of claim 9, wherein the Mz value of the composition is from 600,000 to 800,000 molecular weight units.

16. The film of claim 10, wherein the catalyst system comprises dimethylsilanediylbis (2-methyl-4-phenyl-1-indenyl) zirconium dichloride or dimethylsilandiylbis (2-methyl-4-phenyl-1-indenyl) zirconium dimethyl.

17. A film comprising a crystalline propylene composition comprising a reactor blend comprising at least four copolymers, the composition comprising from 0.05 to 15 wt % comonomer units based on the total weight of the composition, wherein the composition is generated from at least two polymerization steps conducted in the presence of a catalyst system comprising at least two different metallocene catalysts, the composition having a Mz value of from 500,000 to 1,500,000 molecular weight units.

18. The film of claim 17, wherein the metallocene catalysts are each independently represented by the formula:

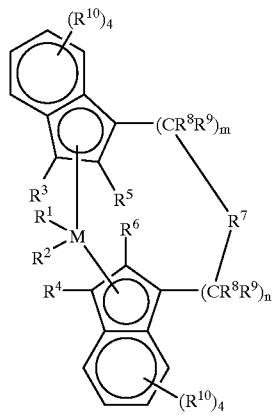

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which is optionally halogenated, a $C_6$–$C_{10}$ aryl group which is optionally halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

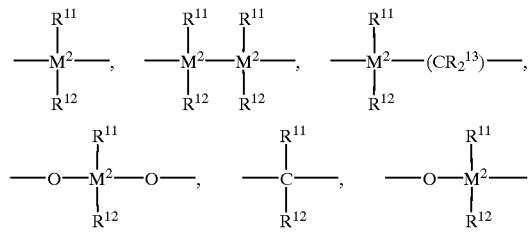

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, optionally to form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals optionally are joined together to form a ring system.

19. The film of claim 17, wherein the metallocene catalysts are selected from the group consisting of:

dimethylsilandiylbis(2-methylindenyl) zirconium dichloride, dimethylsilandiylbis (2-methyl-4-phenyl-1-indenyl) zirconium dichloride, dimethylsilandiylbis(2,4-dimethylindenyl) zirconium dichloride, dimethylsilandiylbis(2,5,6-trimethylindenyl) zirconium dichloride, dimethylsilandiylbis indenyl zirconium dichloride, dimethylsilandiylbis(4,5,6,7-tetrahydroindenyl) zirconium dichloride, dimethylsilandiylbis(2-methyl-4,5-benzoindenyl) zirconium dichloride, dimethylsilandiylbis (2-methyl-4-phenyl-1-indenyl) zirconium dimethyl, dimethylsilandiylbis(2-methyl-4,5-benzoindenyl) zirconium dimethyl, dimethylsilandiylbis(2-methyl-4,6-diisopropylindenyl) zirconium dimethyl, dimethylsilandiylbis(2-ethyl-4-phenyl-1-indenyl) zirconium dimethyl, dimethylsilandiylbis (2-ethyl-4-naphthyl-1-indenyl) zirconium dimethyl, phenyl(methyl)silandiylbis(2-methyl-4-phenyl-1-indenyl) zirconium dimethyl, dimethylsilandiylbis(2-methyl-4-(1-naphthyl)-1-indenyl) zirconium dimethyl, dimethylsilandiylbis(2-methyl-4-(2-naphthyl)1-indenyl) zirconium dimethyl, and dimethylsilandiylbis(2-methyl-indenyl) zirconium dimethyl, and mixtures thereof.

20. The film of claim 17, wherein the hexane extractables level of the composition is less than 3 wt % as measured by 21 CFR 177.1520(d)(3)(ii).

21. The film of claim 17, wherein the comonomer wt % is in the range of from 0.1 to 10.0.

22. The film of claim 17, wherein the comonomer wt % is in the range from 0.5 to 8.

23. The film of claim 18, wherein the catalyst system comprises dimethylsilandiylbis (2-methyl-4-phenyl-1-indenyl) zirconium dichloride or dimethylsilandiylbis (2-methyl-4-phenyl-1-indenyl) zirconium dimethyl.

24. The film of claim 18, wherein the comonomer is present from 0.5 to 5 wt % relative to the total weight of the composition.

25. A film comprising a propylene composition comprising a reactor blend comprising at least four copolymers, the composition comprising from 0.05 to 5 wt % comonomer units based on the total weight of the composition, wherein polymerization is conducted in the presence of a catalyst system comprising at least two different metallocene catalysts.

26. The film of claim 25, wherein the metallocene catalysts are each independently represented by the formula:

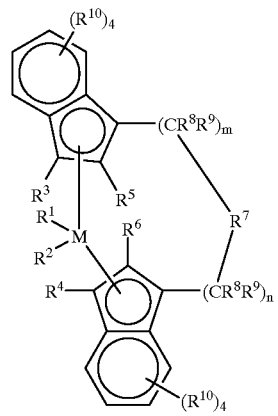

where in M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which is optionally halogenated, a $C_6$–$C_{10}$ aryl group which is optionally halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

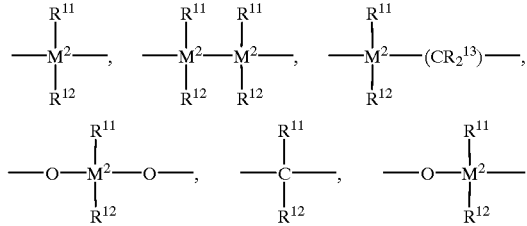

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein $R^{11}$, $R^{12}$ and $R^{13}$ are identical or different and are a hydrogen atom, a halogen atom, a $C_1$–$C_{20}$ alkyl group, a fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, optionally to form ring systems;

$M^2$ is silicon, germanium or tin;

$R^8$ and $R^9$ are identical or different and have the meanings stated for $R_{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals optionally are joined together to form a ring system.

27. The film of claim 25, wherein the metallocene catalysts are selected from the group consisting of:

dimethylsilandiylbis(2-methylindenyl) zirconium dichloride, dimethylsilandiylbis (2-methyl-4-phenyl-1-indenyl) zirconium dichloride, dimethylsilandiylbis(2,4-dimethylindenyl) zirconium dichloride dimethylsilandiylbis(2,5,6-trimethylindenyl) zirconium dichloride, dimethylsilandiylbis indenyl zirconium dichloride, dimethylsilandiylbis(4,5,6,7-tetrahydroindenyl) zirconium dichloride, dimethylsilandiylbis(2-methyl-4,5-benzoindenyl) zirconium dichloride, dimethylsilandiylbis (2-methyl-4-phenyl-1-indenyl) zirconium dimethyl, dimethylsilandiylbis(2-methyl-4,5-benzoindenyl) zirconium dimethyl, dimethylsilandiylbis(2-methyl-4,6-diisopropylindenyl) zirconium dimethyl, dimethylsilandiylbis(2-ethyl-4-phenyl-1-indenyl) zirconium dimethyl, dimethylsilandiylbis (2-ethyl-4-naphthyl-1-indenyl) zirconium dimethyl, phenyl(methyl)silandiylbis(2-methyl-4-phenyl-1-indenyl) zirconium dimethyl, dimethylsilandiylbis(2-methyl-4-(1-naphthyl)-1-indenyl) zirconium dimethyl, dimethylsilandiylbis(2-methyl-4-(2-naphthyl)-1-indenyl) zirconium dimethyl, and dimethylsilandiylbis(2-methyl-indenyl) zirconium dimethyl, and mixtures thereof.

28. The film of claim 25, wherein the hexane extractables level of the composition is less than 3 wt % as measured by 21 CFR 177.1520(d)(3)(ii).

* * * * *